(12) United States Patent
Dixon et al.

(10) Patent No.: US 9,426,060 B2
(45) Date of Patent: Aug. 23, 2016

(54) SOFTWARE DEFINED NETWORK (SDN) SWITCH CLUSTERS HAVING LAYER-3 DISTRIBUTED ROUTER FUNCTIONALITY

(71) Applicant: International Business Machines Corporation, Armonk, NY (US)

(72) Inventors: Colin K. Dixon, Austin, TX (US); Wesley M. Felter, Austin, TX (US); Sriharsha Jayanarayana, Bangalore (IN); Dayavanti G. Kamath, Santa Clara, CA (US); Abhijit P. Kumbhare, San Jose, CA (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/961,830

(22) Filed: Aug. 7, 2013

(65) Prior Publication Data

US 2015/0043576 A1    Feb. 12, 2015

(51) Int. Cl.
*H04L 12/721* (2013.01)
*H04L 12/18* (2006.01)
*H04L 12/713* (2013.01)
*H04L 29/12* (2006.01)

(52) U.S. Cl.
CPC .............. *H04L 45/34* (2013.01); *H04L 12/184* (2013.01); *H04L 45/586* (2013.01); *H04L 61/103* (2013.01)

(58) Field of Classification Search
CPC .............................. H04L 45/16; H04L 12/185
USPC ........................................................ 370/390
See application file for complete search history.

(56) References Cited

U.S. PATENT DOCUMENTS 6,507,564 B1    1/2003   Merchant
6,542,930 B1    4/2003   Auvenshine
(Continued)

FOREIGN PATENT DOCUMENTS

CN    1484405 A    3/2004
CN    101980488 A    2/2011
(Continued)

OTHER PUBLICATIONS

Stephens et al., "PAST: Scalable Ethernet for Data Centers," CoNEXT '12, Dec. 10-13, 2012, pp. 49-60.
(Continued)

*Primary Examiner* — Mark Rinehart
*Assistant Examiner* — Peter Solinsky
(74) *Attorney, Agent, or Firm* — Zilka-Kotab, PC

(57) ABSTRACT

According to one embodiment, Layer-3 (L3) distributed router functionality is provided to a switch cluster by receiving an address resolution protocol (ARP) request packet from a first host at an entry switch in a switch cluster, a switch controller being in communication with the entry switch, and the ARP request packet including a virtual router IP address of the switch controller as a target, forwarding the ARP request packet to the switch controller after adding a header that adheres to a communication protocol used by the switch controller, receiving an ARP response packet from the switch controller indicating: a source IP address corresponding to a virtual router of the switch controller and a SMAC corresponding to the switch controller, forwarding the ARP response packet to the first host after stripping the communication protocol header, and setting the virtual router as a default gateway for traffic received from the first host.

20 Claims, 17 Drawing Sheets

(56) References Cited

U.S. PATENT DOCUMENTS

| | | | |
|---|---|---|---|
| 6,556,547 B1* | 4/2003 | Srikanth et al. | 370/317 |
| 7,724,734 B1 | 5/2010 | Grosser et al. | |
| 7,832,009 B2 | 11/2010 | Wang et al. | |
| 7,843,926 B1 | 11/2010 | Muller et al. | |
| 8,059,658 B1 | 11/2011 | Rovner et al. | |
| 8,208,377 B2 | 6/2012 | Subramanian et al. | |
| 8,259,726 B2 | 9/2012 | Subramanian et al. | |
| 2003/0061379 A1* | 3/2003 | Craddock et al. | 709/238 |
| 2003/0206528 A1 | 11/2003 | Lingafelt et al. | |
| 2005/0008016 A1 | 1/2005 | Shimozono et al. | |
| 2006/0239183 A1* | 10/2006 | Robitaille | G06F 1/266 370/217 |
| 2007/0010971 A1* | 1/2007 | Nikolova et al. | 702/188 |
| 2007/0091903 A1 | 4/2007 | Atkinson | |
| 2008/0144644 A1* | 6/2008 | Allan et al. | 370/401 |
| 2008/0186968 A1* | 8/2008 | Farinacci | H04L 12/4633 370/392 |
| 2009/0092137 A1* | 4/2009 | Haigh et al. | 370/392 |
| 2011/0295991 A1 | 12/2011 | Aida | |
| 2011/0317703 A1* | 12/2011 | Dunbar | H04L 12/462 370/392 |
| 2012/0195318 A1* | 8/2012 | Numata et al. | 370/392 |
| 2012/0311184 A1* | 12/2012 | Yamada | 709/245 |
| 2013/0058358 A1* | 3/2013 | Fulton et al. | 370/412 |
| 2013/0081131 A1 | 3/2013 | Yokota | |
| 2013/0083782 A1 | 4/2013 | Murphy et al. | |
| 2013/0094350 A1 | 4/2013 | Mandal et al. | |
| 2013/0121164 A1* | 5/2013 | Shabtay | H04L 12/4641 370/241.1 |
| 2013/0195113 A1 | 8/2013 | Kotha et al. | |
| 2013/0223277 A1 | 8/2013 | DeCusatis et al. | |
| 2013/0254891 A1* | 9/2013 | Onoda | 726/23 |
| 2013/0279371 A1* | 10/2013 | Takashima et al. | 370/254 |
| 2013/0318243 A1 | 11/2013 | Chinthalapati et al. | |
| 2014/0023074 A1* | 1/2014 | Mishra et al. | 370/390 |
| 2014/0098823 A1 | 4/2014 | Kapadia et al. | |
| 2014/0146674 A1* | 5/2014 | Wang et al. | 370/235 |
| 2014/0241353 A1 | 8/2014 | Zhang et al. | |
| 2015/0016294 A1 | 1/2015 | Hegge | |
| 2015/0071111 A1 | 3/2015 | Tao et al. | |
| 2015/0098475 A1 | 4/2015 | Jayanarayana et al. | |
| 2015/0195201 A1* | 7/2015 | Li | H04L 45/02 370/392 |
| 2015/0236900 A1* | 8/2015 | Chung | H04L 69/02 709/221 |
| 2015/0372917 A1* | 12/2015 | Biswas | H04L 69/04 370/392 |

FOREIGN PATENT DOCUMENTS

| | | |
|---|---|---|
| CN | 102577271 | 7/2012 |
| EP | 2487843 | 8/2012 |
| JP | 201378087 | 4/2013 |
| WO | 2011043416 | 4/2011 |
| WO | 2012096131 A1 | 7/2012 |

OTHER PUBLICATIONS

Written Opinion from PCT Application No. PCT/JP2014/003096 mailed Sep. 2, 2014.
International Search Report from application No. PCT/JP2014/003096 mailed Sep. 2, 2014.
Higuchi, S., "Konna yonaka ni Openflow de Network wo programming," Software Design, Oct. 2011, pp. 114-119 (non-translated).
Lynch, Bob, "OpenFlow—Can It Scale?," sdn central, Jun. 15, 2013, pp. 1-4.
Cai et al., "Maestro: A System for Scalable OpenFlow Control", Technical Report for Rice University, Dec. 2010, pp. 1-10.
Hersey, Dan, "Building a Scalable OpenFlow Network with MAC Based Routing", Apr. 23, 2012, http://virtualnow.net/2012/04/23/building-a-scalableopenflow-network-with-mac-based-routing/, pp. 1-5.
Koponen et al., "Onix: A Distributed Control Platform for Large-Scale Production Networks", Proceedings of OSDI'10 Proceedings of the 9th USENIX Conference on Operating Systems Design and Implementation, No. 1-6, published in 2010, pp. 1-14.
Carter, John, "SPARTA: Scalable Per-Address RouTing Architecture", IBM 2012, pp. 1-20.
Bolla et al., "DROP: An Open-Source Project Towards Distributed SW Router Architectures", Proceedings of IEEE Global Telecommunications Conference, (GLOBECOM 2009), Nov. 30, 2009 to Dec. 4, 2009, pp. 1-7.
International Search Report and Written Opinion from International Application No. PCT/CN2014/087653, dated Dec. 31, 2014.
Statement of Relevance of Non-Translated Foreign Document CN101980488.
Jayanarayana et al., U.S. Appl. No. 14/050,288, filed Oct. 9, 2013.
Non-Final Office Action from U.S. Appl. No. 14/050,288, dated Apr. 8, 2015.
Second Written Opinion from PCT Application No. PCT/JP2014/003096, dated Feb. 10, 2015.
International Preliminary Report on Patentability from International Application No. PCT/JP2014/003096, dated Jun. 23, 2015.
Non-Final Office Action from U.S. Appl. No. 14/050,288, dated Oct. 22, 2015.
Extended European Search Report from European Application No. 14835332.9, dated Jul. 1, 2016.
Mann et al., "CrossRoads: Seamless VM Mobility Across Data Centers through Software Defined Networking," IEEE Network Operations and Management Symposium, Apr. 2012, pp. 88-96.

* cited by examiner

SOFTWARE DEFINED NETWORK (SDN) SWITCH CLUSTERS HAVING LAYER-3 DISTRIBUTED ROUTER FUNCTIONALITY

BACKGROUND

The present invention relates to data center infrastructure, and more particularly, this invention relates to switch clusters having Layer-3 distributed router functionality.

A common practice for software-defined network (SDN) controllers is to use the OpenFlow protocol to create a logical OpenFlow domain or a switch cluster comprising a plurality of switches therein. However, any other protocol may be used to create these switch clusters. The switch cluster does not exist in a vacuum and communication with entities outside of the switch cluster is needed in order to function in a real application. This communication typically takes place with non-SDN Layer-2/Layer-3 (L2/L3) devices and networks.

L2 communications with a non-SDN device is typically handled in any commercially available SDN controller, such as an OpenFlow controller utilizing Floodlight. However, conventional SDN controllers are not capable of handling L3 communications.

One prior attempt to provide L3 communications to a switch cluster is virtual router support in NEC's Programmable Flow Controller; however, it relies on a ternary content-addressable memory (TCAM)-based OpenFlow Table alone, which in most switches has a significantly lower number of flow table entries and hence does not scale effectively to be used in switch clusters.

Accordingly, it would be beneficial to provide a mechanism to provide L3 support for a SDN-based switch cluster in a scalable fashion. Existing conventional methods to accomplish L3 communications rely on OpenFlow 1.0 style TCAM tables, also known as access control list (ACL) tables, alone which are expensive to implement and typically have a much lower number of total entries.

SUMMARY

In one embodiment, a system includes a switch cluster having a plurality of switches, the plurality of switches including at least an entry switch having an interface for connecting to a first host and an exit switch having an interface for connecting to a second host, and a switch controller in communication with the plurality of switches in the switch cluster via a communication protocol, wherein the entry switch is configured to: receive an address resolution protocol (ARP) request packet from the first host, wherein the ARP request packet includes an internet protocol (IP) address corresponding to a virtual router of the switch controller as a target, forward the ARP request packet to the switch controller after adding a header to the ARP request packet that adheres to the communication protocol, receive an ARP response packet from the switch controller, the ARP response packet indicating: a source IP address corresponding to a virtual router of the switch controller and a source media access address (SMAC) corresponding to the switch controller, forward the ARP response packet to the first host after stripping a header from the ARP response packet that adheres to the communication protocol, and set the virtual router of the switch controller as a default gateway for traffic received from the first host.

In another embodiment, a method for providing Layer-3 (L3) distributed router functionality to a switch cluster includes receiving an ARP request packet from a first host at an entry switch in a switch cluster, wherein a switch controller is in communication with the entry switch, and wherein the ARP request packet includes a virtual router IP address of the switch controller as a target, forwarding the ARP request packet to the switch controller after adding a header to the ARP request packet that adheres to a communication protocol used by the switch controller to communicate with switches in the switch cluster, receiving an ARP response packet from the switch controller, the ARP response packet indicating: a source IP address corresponding to a virtual router of the switch controller and a SMAC corresponding to the switch controller, forwarding the ARP response packet to the first host after stripping a header from the ARP response packet that adheres to the communication protocol used by the switch controller, and setting the virtual router of the switch controller as a default gateway for traffic received from the first host.

According to another embodiment, a method for providing L3 distributed router functionality to a switch cluster includes receiving an ARP request packet at a switch controller from an entry switch in a switch cluster, wherein the entry switch is connected to a first host, and wherein the switch controller utilizes a communication protocol to communicate with switches in the switch cluster, and sending an ARP response packet to the entry switch, the ARP response packet indicating: a MAC address of the switch controller as a SMAC for the ARP response packet and an IP address of a virtual router of the switch controller as being a source of the ARP response packet.

Other aspects and embodiments of the present invention will become apparent from the following detailed description, which, when taken in conjunction with the drawings, illustrate by way of example the principles of the invention.

DETAILED DESCRIPTION

Figure 1:
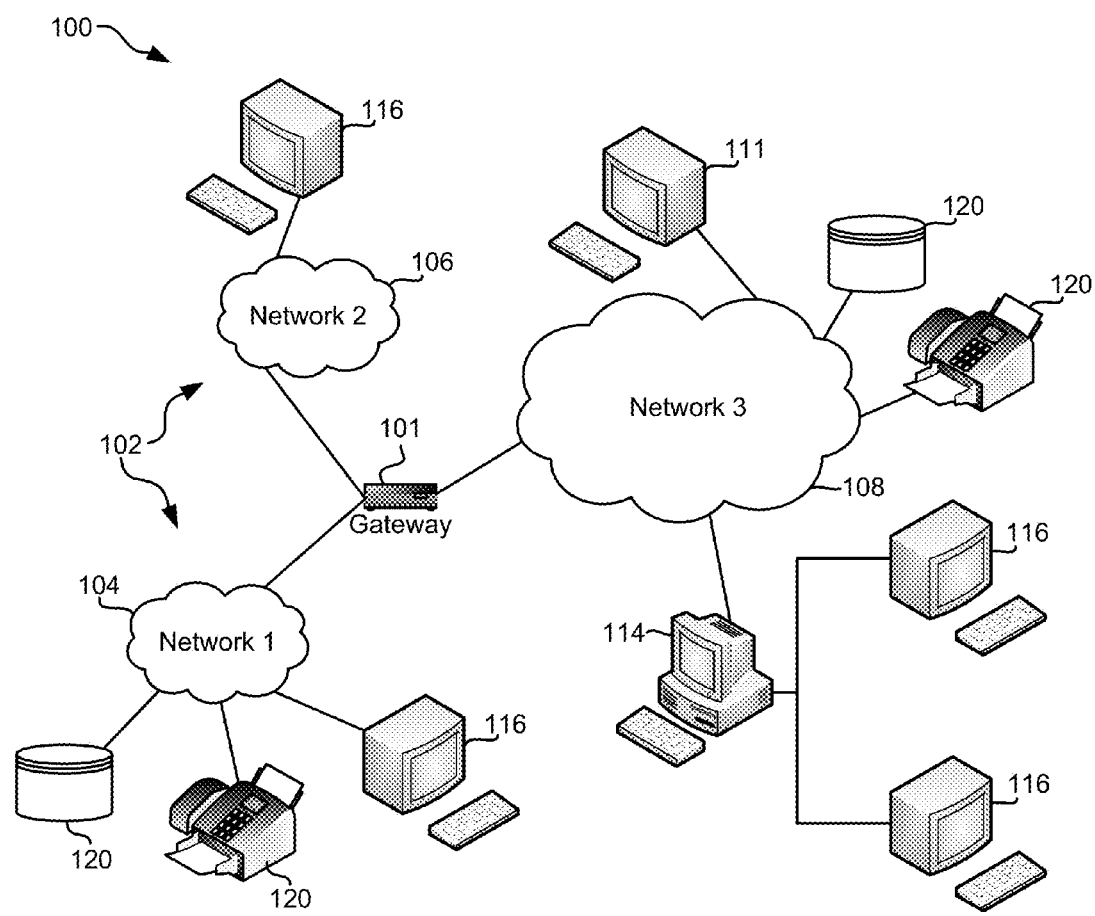
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In addition to using an access control list (ACL) or ternary content-addressable memory (TCAM)-based Table for Layer-3 (L3) switch cluster support, one embodiment provides for using L3 Forwarding Tables, which usually have much higher capacity (measured in number of entries) and provide for the possibility to scale better than ACL or TCAM-based Tables.

Each switch in a switch cluster comprises a L3 Forwarding Table, also known as a Route Table or a Longest Prefix Match Table (LPM), and a Host Table or address resolution protocol (ARP) Table, which expose L3 Forwarding Tables to a software-defined network (SDN) controller, via SDN communication protocols (such as OpenFlow), while retaining the possibility to use TCAM-based Tables in any switches which are not SDN-capable (and/or not involved in the switch cluster) for access to L3 Forwarding Tables.

L3 Forwarding Tables typically have more entries than the more expensive TCAM-based SDN Table (e.g., IBM's G8264 which has 750 TCAM entries as compared to 16,000+ LPM routes).

Conventional switch clusters rely on a SDN controller to initialize and manage the switches in the switch cluster. Any suitable SDN controller may be used, such as an OpenFlow controller, Floodlight, NEC's Programmable Flow Controller (PFC), IBM's Programmable Network Controller (PNC), etc.

According to one embodiment, using this SDN controller, each switch cluster may be L3-aware and may support L3 subnets and forwarding as a single entity. Different types of switch clusters may be used in the methods described herein, including traditional OpenFlow clusters (like Floodlight, NEC PFC, IBM PNC), and SPARTA clusters using IBM's Scalable Per Address RouTing Architecture (SPARTA). According to another embodiment, each switch cluster acts as one virtual L3 router with virtual local area network (VLAN)-based internet protocol (IP) interfaces—referred to herein as a distributed router approach.

In one general embodiment, a system includes a switch cluster having a plurality of switches, the plurality of switches including at least an entry switch having an interface for connecting to a first host and an exit switch having an interface for connecting to a second host, and a switch controller in communication with the plurality of switches in the switch cluster via a communication protocol, wherein the entry switch is configured to: receive an address resolution protocol (ARP) request packet from the first host, wherein the ARP request packet includes an IP address corresponding to a virtual router of the switch controller as a target, forward the ARP request packet to the switch controller after adding a header to the ARP request packet that adheres to the communication protocol, receive an ARP response packet from the switch controller, the ARP response packet indicating: a source IP address corresponding to a virtual router of the switch controller and a source media access address (SMAC) corresponding to the switch controller, forward the ARP response packet to the first host after stripping a header from the ARP response packet that adheres to the communication protocol, and set the virtual router of the switch controller as a default gateway for traffic received from the first host.

In another general embodiment, a method for providing L3 distributed router functionality to a switch cluster includes receiving an ARP request packet from a first host at an entry switch in a switch cluster, wherein a switch controller is in communication with the entry switch, and wherein the ARP request packet includes a virtual router IP address of the switch controller as a target, forwarding the ARP request packet to the switch controller after adding a header to the ARP request packet that adheres to a communication protocol used by the switch controller to communicate with switches in the switch cluster, receiving an ARP response packet from the switch controller, the ARP response packet indicating: a source IP address corresponding to a virtual router of the switch controller and a SMAC corresponding to the switch controller, forwarding the ARP response packet to the first host after stripping a header from the ARP response packet that adheres to the communication protocol used by the switch controller, and setting the virtual router of the switch controller as a default gateway for traffic received from the first host.

According to another general embodiment, a method for providing L3 distributed router functionality to a switch cluster includes receiving an ARP request packet at a switch controller from an entry switch in a switch cluster, wherein the entry switch is connected to a first host, and wherein the switch controller utilizes a communication protocol to communicate with switches in the switch cluster, and sending an ARP response packet to the entry switch, the ARP response packet indicating: a MAC address of the switch controller as a SMAC for the ARP response packet and an IP address of a virtual router of the switch controller as being a source of the ARP response packet.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
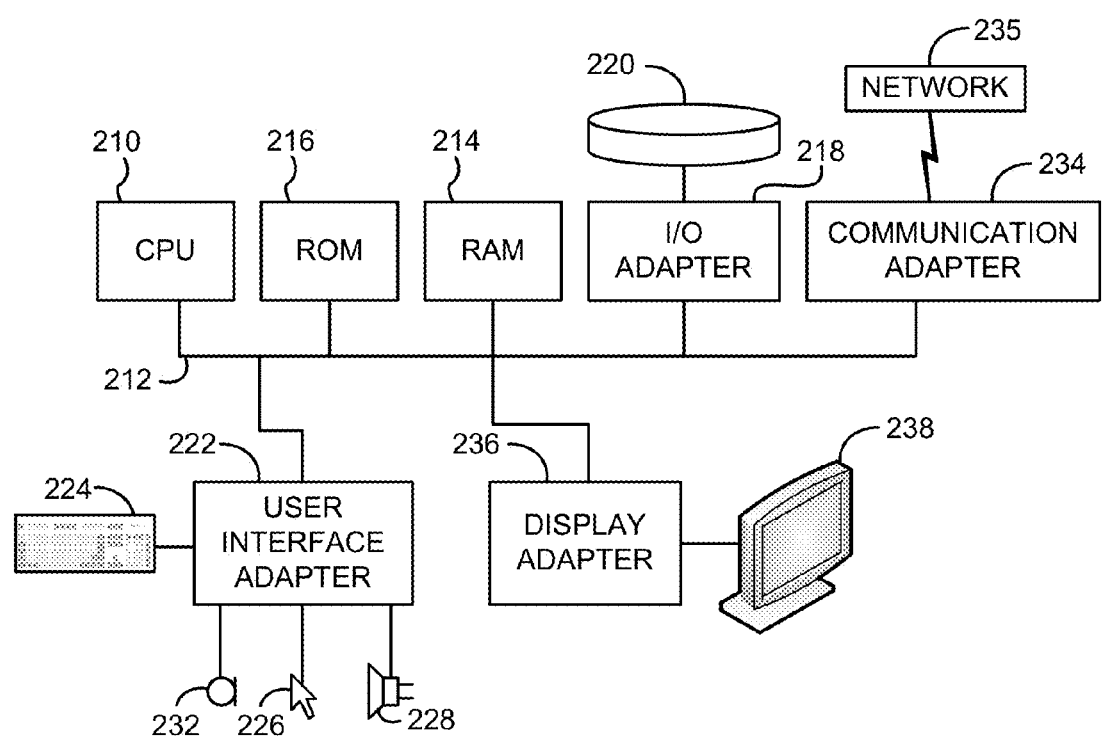
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
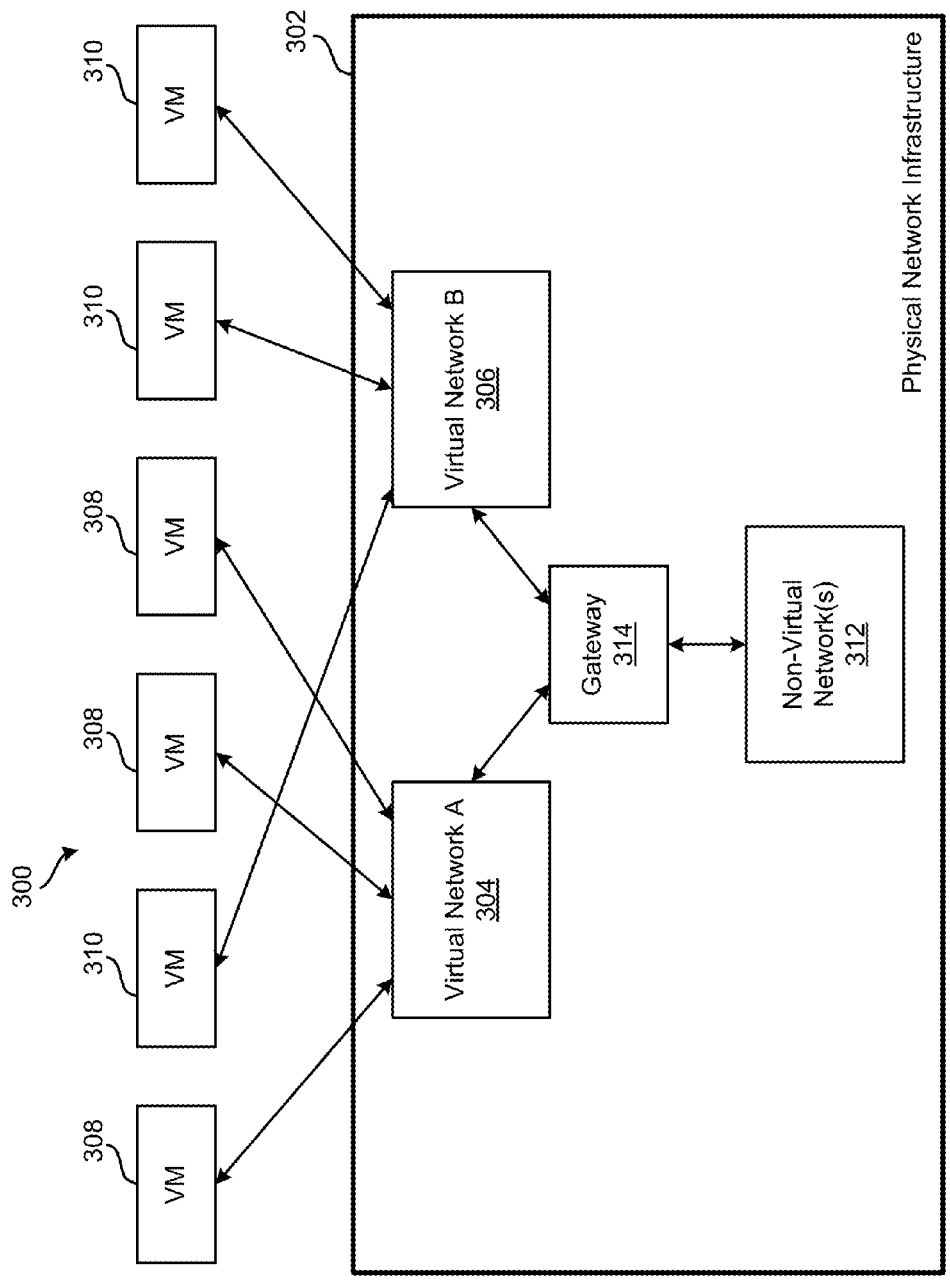
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
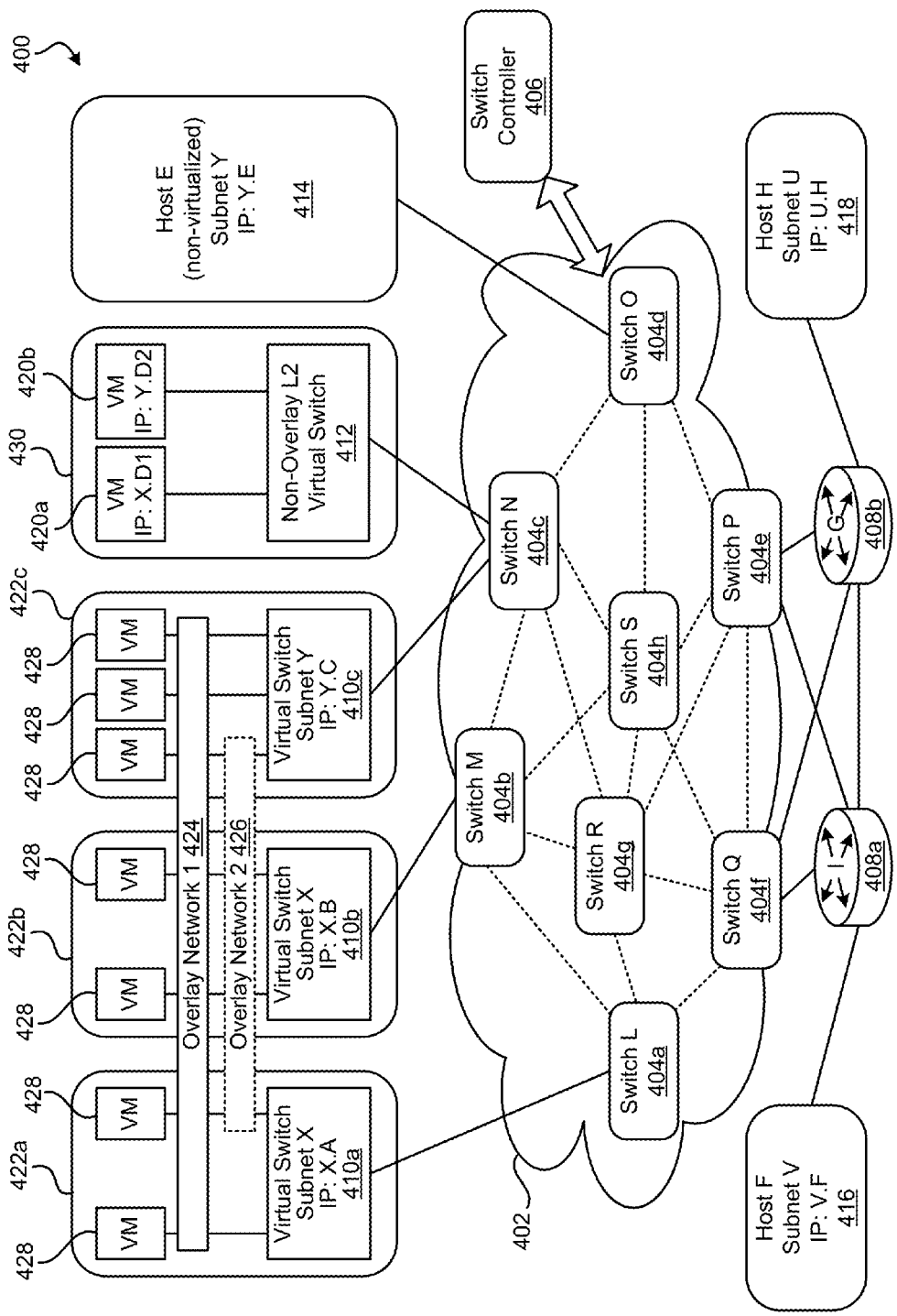
FIG. 4 is a simplified topological diagram of a software-defined network (SDN) switch cluster operating as a distributed router, according to one embodiment.

FIG. 4 shows a simplified topological diagram of a software-defined network (SDN) system 400 that has a switch cluster 402 operating as a distributed router, according to one embodiment. The switch cluster 402 comprises a plurality of switches 404, each switch 404a, 404b, . . . , 404n, being connected in the cluster. The switches that are explicitly shown (Switch L 404a, Switch M 404b, Switch N 404c, Switch O 404d, Switch P 404e, Switch Q 404f, Switch R 404g, Switch S 404h) are for exemplary purposes only, as more or less switches 404 than those explicitly shown may be present in the switch cluster 402. An L3 aware switch controller 406, such as an SDN controller, is connected to each switch 404 in the switch cluster 402, either directly or via one or more additional connections and/or devices. Additionally, some switches 404 are connected to one or more other virtual or physical devices external to the switch cluster 402. For example, Switch L 404a is connected to vSwitch 410a, Switch Q 404f is connected to Router I 408a, Switch N 404c is connected to non-overlay L2 vSwitch 412 and vSwitch 410c, etc. Of course, these connections are for exemplary purposes only, and any arrangement of connections, number of switches 404 in the switch cluster 402, and any other details about the system 400 may be adapted to suit the needs of whichever installation it is to be used in, as would be understood by one of skill in the art.

The system 400 also has several devices outside of the switch cluster 402, such as Host F 416 which is connected to the switch cluster 402 via Router I 408a, Host H 418 which is connected to the switch cluster 402 via Router G 408b, Host E 414 which is connected to the switch cluster 402 via Switch O 404d, etc. Also capable of being connected to the switch cluster 402 is a non-overlay L2 virtual switch 412 that is supported by a physical server 430. This server may also host VMs 420a and 420b, which have their own IP addresses.

Three servers 422 are shown hosting a plurality of VMs 428, each server 422a, 422b, 422c, etc., having a virtualization platform or hypervisor (such as Hyper-V, KVM, Virtual Box, VMware Workstation, etc.) which hosts the VMs 428 and a vSwitch 410. In addition, the hosted VMs 428 on the various servers 422 may be included in one or more overlay networks, such as Overlay networks 1 or 2 (424 or 426, respectively). How the VMs 428 are divided amongst the overlay networks is a design consideration that may be chosen upon implementing the system 400 and adjusting according to needs and desires.

The number of various devices (e.g., Router G 408b, server 422a, Host E 414, etc.) connected to the switch cluster 402 are for exemplary purposes only, and not limiting on the number of devices which may be connected to a switch cluster 402.

Each device in the system 400, whether implemented as a physical or a virtual device, and regardless of whether it is implemented in hardware, software, or a combination thereof, is described as having an internet protocol (IP) address. Due to limited space, the routers 408 do not have their IP addresses or subnet information shown. However, Router I 408a is in Subnet W, and has a router address of W.I, while Router G 408b is in Subnet Z and has a router address of Z.G.

Some of the concepts used herein are now described with reference to FIG. 4. An IP Interface is a logical entity which has an interface to an IP subnet. Typically, an IP interface for a traditional Ethernet router is associated with either a physical interface (port) or a VLAN. In the distributed router shown in FIG. 4, an IP interface is associated with a VLAN.

Each of the switches 404 in the switch cluster 402 are capable of understanding commands from and exchanging information with the switch controller 406. In order to implement this arrangement, each switch 404 may adhere to Open-Flow standards/protocol, or some other suitable architecture or protocol known in the art. Furthermore, the switch controller 406 is also capable of communicating according to the selected protocol in order to exchange information with each switch 404 in the switch cluster 402.

The switch cluster 402 may be referred to as an OpenFlow Cluster when it includes a collection of contiguous OpenFlow switches which act as a single entity (as far as L3 connectivity is concerned) with multiple interfaces to external devices.

A direct subnet is a subnet which is directly connected to the switch cluster 402—in other words, it is a subnet on which the switch controller 406 has an IP interface, e.g., subnets X, Y, Z, and W.

An indirect subnet is a subnet which is not directly connected to the switch cluster 402 and is reached via a router 408 external to the switch cluster 402—in other words, it is a subnet on which the switch controller 406 has no IP interface, e.g., subnets U and V.

By using the switch cluster 402 as a distributed router, the cluster interface address is treated as an "anycast" address. An entry switch is responsible for L3 routing, and a virtual router is instantiated for each subnet in the switch controller 406. An instance of this virtual router is logically instantiated on all switches 404 using the switch controller's 406 access (e.g., via OpenFlow) to each switch's L3 forwarding table.

All virtual routers use the same media access control (MAC) address (referred to as VIRT_RTR_MAC). Hence, any address resolution protocol (ARP) request for any gateway address is responded to with the VIRT_RTR_MAC address. Also, on all the switches 404, a route "flow" is installed for each directly connected subnet and each indirect static or learned route (including a default route—which is a special static route for prefix 0/0).

A directly connected subnet route directs to the switch controller 406. Every individual destination matching these uses a separate host entry. Examples of directly connected routes include subnets X, Y, Z, and W in FIG. 4.

An indirectly connected subnet route directs to a next hop MAC address/port. These indirectly connected subnet routes do not use separate host entries for each destination IP; however, they do use a single L3 Longest Prefix Match (LPM) entry for the entire subnet. Examples of indirectly connected routes include subnet V and the default route in FIG. 4.

Route flows are installed with priority equal to their prefix length such that longest prefix length match rules are always obeyed.

Additionally, the route "flows" are programmed into the L3 LPM tables, e.g., the Forwarding Information Base (FIB) of each switch. Accordingly, the FIB may be used to support many more routes than what is available in the ternary content-addressable memory (TCAM) flow tables (for example, 16,000+ routes vs. 750 TCAM flows). However, some devices utilizing legacy switch operating protocols, such as OpenFlow-enabled switches, do not have direct access to the switch L3 FIB via OpenFlow. In this case, the route "flow" may be installed in the current TCAM flow table, with a drawback being the limited TCAM flow table size which does not scale for larger deployments.

On the entry switch, when the first time an L3 packet is received for a directly connected host, the packet is sent to the switch controller 406 for ARP resolution.

After ARP resolution, the switch controller 406 installs a host entry flow on the entry switch for subsequent L3 packets directed to the same host. According to one embodiment, this host entry flow modification may include the following relationships:
  Match VLAN=VLAN of the IP interface
  Match destination MAC (DMAC)=VIRT_RTR_MAC
  Match Dest-IP=Destination IP address
  Rewrite VLAN=VLAN of the destination host
  Rewrite source MAC (SMAC)=VIRT_RTR_MAC
  Rewrite DMAC=MAC of the destination host
  Forwarding port=Physical port through which the "Rewrite DMAC" is reachable Using this flow modification, the L3 host entry is a reactive installation in the sense that it is only installed when an L3 packet is seen for the host. This helps in conserving the number of host entry flows consumed compared to proactive installation on all the switches.

The reactive installation of L3 host entries is similar to that of a traditional non-switch controlled router installing ARP entries into its forwarding cache.

In addition, transformation is programmed in the L3 Host Forwarding Table of the entry switch. However, legacy switches will not have direct access to the switch L3 FIB via the communication protocol, such as a legacy OpenFlow-enabled switch.

When the legacy switch does not have direct access to the switch L3 FIB via the communication protocol, the host "flow" may be installed in the current TCAM flow table. One drawback to this procedure is the limited TCAM flow table size (compared to L3 host forwarding tables of most switches) and hence will not scale for larger deployments.

On the entry switch, when the first time an L3 packet is seen for an indirect host of route that does not have the next hop ARP resolved, the packet is sent to the controller for ARP resolution. After ARP resolution the controller installs a route "flow" entry on the entry switch for subsequent L3 packets to the same route. According to one embodiment, this route flow modification may include the following relationships:
  Match VLAN=VLAN of the IP interface
  Match DMAC=VIRT_RTR_MAC
  Match Dest-IP=Prefix
  Match Dest-IP Mask=Prefix Subnet Mask
  Rewrite VLAN=VLAN of the next hop
  Rewrite SMAC=VIRT_RTR_MAC
  Rewrite DMAC=MAC of the next hop
  Forwarding port=Physical Port through which the "Rewrite DMAC" is reachable As mentioned before, the transformation is programmed in the L3 Route Forwarding Table (FIB) of all the entry switches. However, if a legacy switch does not have access to the L3 FIB, these may be programmed into the communication protocol TCAM based flow table, such as via OpenFlow.

Now referring to FIGS. 5A-5F, a switch cluster 500 is shown according to one embodiment. The switch cluster 500 comprises a plurality of switches 504a, 504b, . . . , 504n, such as Intermediate (Int.) Switch Y 504b, each switch being connected to a switch controller 506 via one or more switch controller connections. Any type of switch controller 506 may be used, such as an OpenFlow capable controller which communicates via OpenFlow to the plurality of switches 504. Each switch 504 has an interface capable of connecting to one or more hosts 502a, 502b, . . . , 502n. In some embodiments, one or more hosts 502, such as Device A 502a, etc., may be connected to the switch cluster 500 via one of the switches 504, such as Entry Switch X 504a. The devices which are shown grayed out in the various figures do not have any actions in one or more operations described in the figure. Any type of interface known in the art may be used.

The explicitly shown switches (Entry Switch X 504a, Int. Switch Y 504b, Exit Switch Z 504c), host devices (Device A 502a, Device B 502b, Device C 502c), and virtual routers on the switch controller 506 are for exemplary purposes only as any number of switches 504, devices 502, virtual routers, and any other suitable components may be included in or connected to the switch cluster 500 as would be understood by one of skill in the art.

With the aid of the figures, a first situation is described where a first host which is connected to a first subnet is connected to a second host which is connected to a second subnet. For the sake of this description, the first host is Device A 502a which is connected directly to Entry Switch X 504a, and the second host is Device C 502c which is connected directly to Exit Switch Z 504c. Furthermore, the first subnet is provided by the switch controller's virtual router having an IP address of 10.1.1.1, while the second subnet is provided by a second virtual router having an IP address of 10.2.1.1. Of course, the descriptions provided herein may apply to any two hosts connected to a switch cluster 500 and any subnets provided by the switch controller 506, as would be understood by one of skill in the art.

Figure 5A:
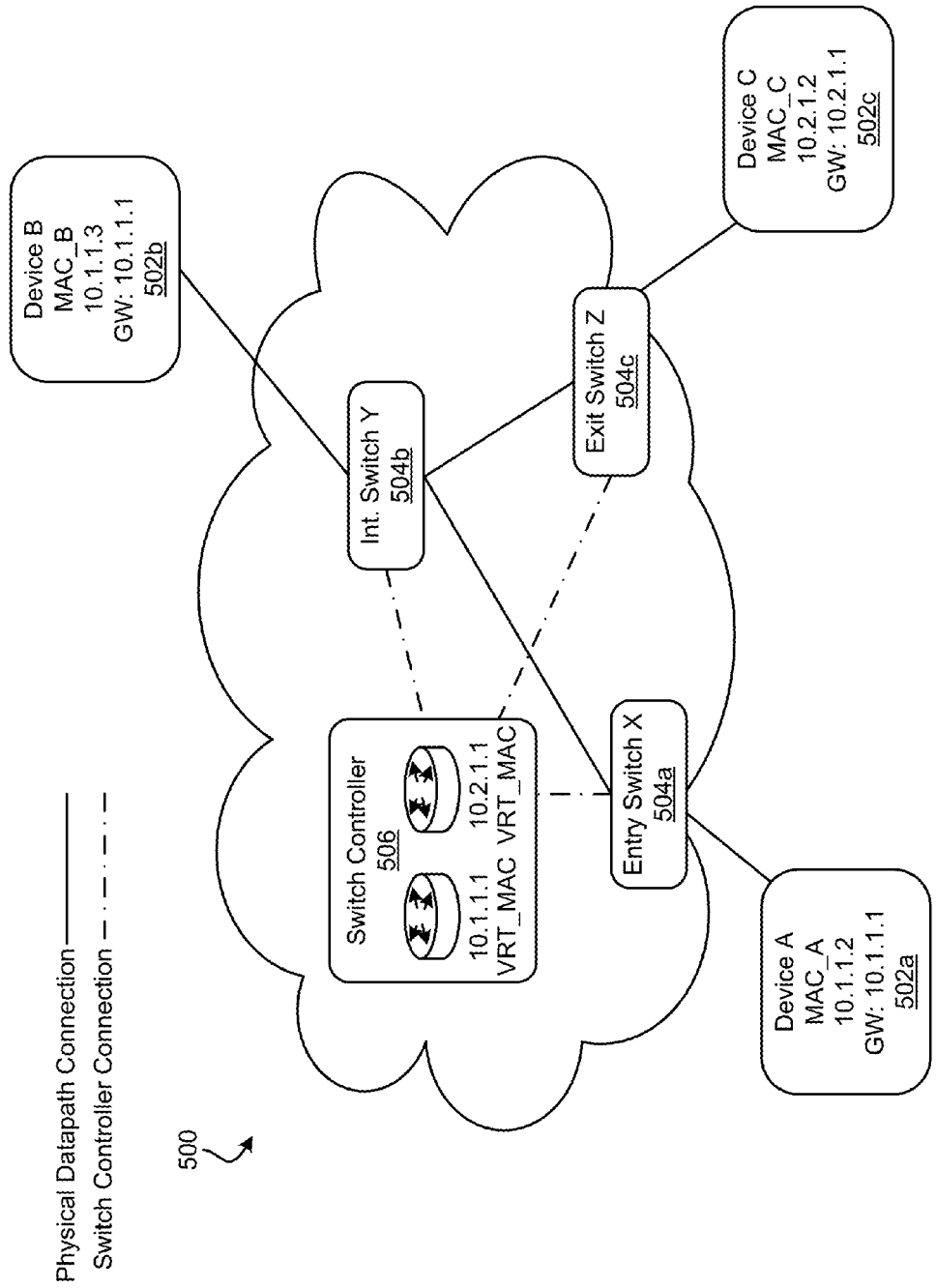
FIGS. 5A-5F show a switch cluster according to one embodiment.
Figure 5B:
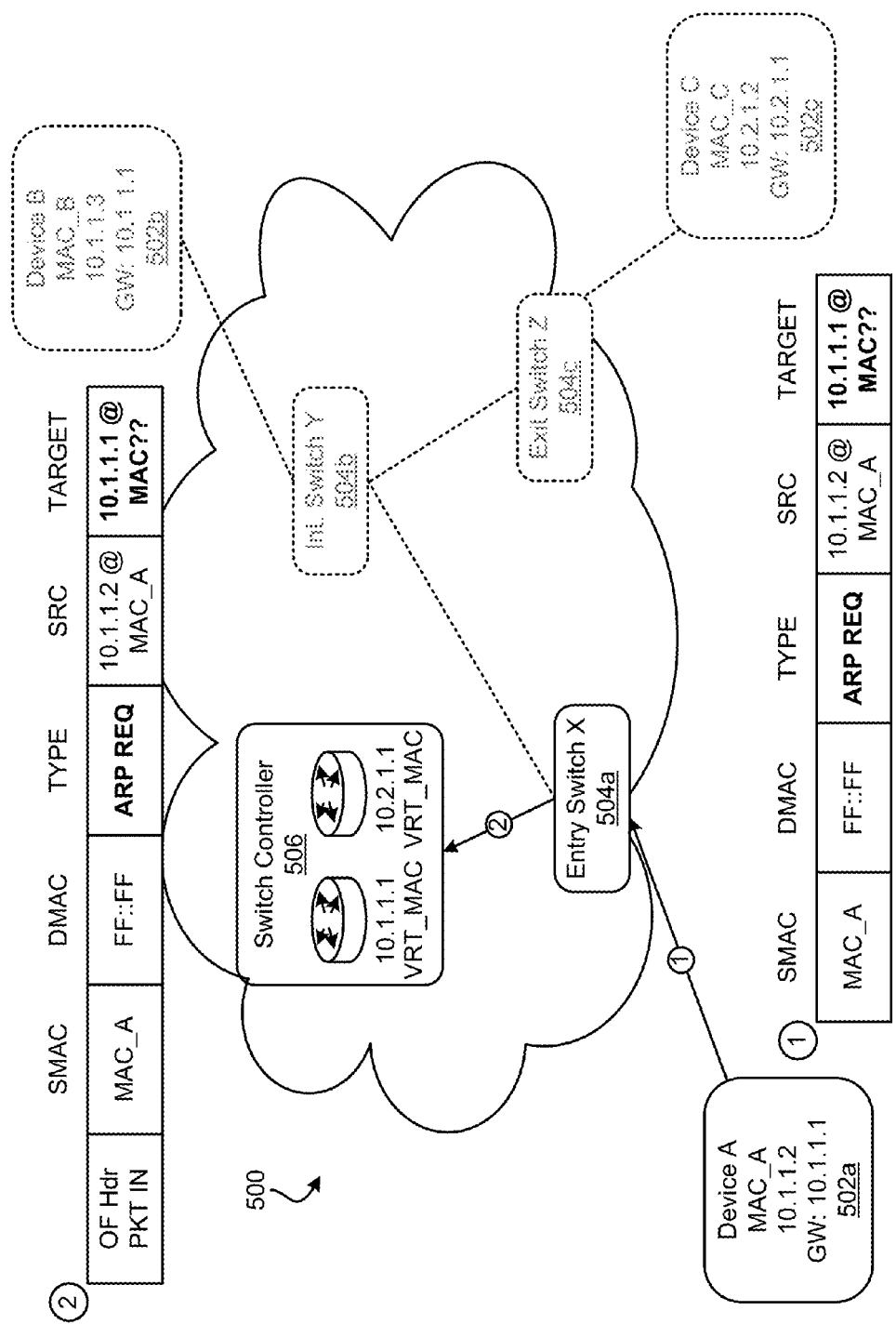

As shown in FIG. 5B, when Device A 502a sends a packet for the first time through the switch cluster 500 (through the gateway), source gateway ARP resolution is performed. To perform source gateway ARP resolution, Device A 502a sends a packet having the format shown by packet format (1), where the source MAC address (SMAC) is set as the MAC address of Device A 502a, the destination MAC address (DMAC) is set as FF::FF, the type of packet is an ARP request packet (ARP REQ), the source is indicated as 10.1.1.2 @ MAC_A, and the target is indicated as 10.1.1.1 @ an unknown MAC address (to be determined by the ARP request). This packet is sent to the Entry Switch X 504a, which forwards the packet on to the switch controller 506 after adjusting the format of the packet, as indicated by packet format (2). This packet format (2) is an input packet adhering to OpenFlow (OF) protocol or some other suitable protocol for communication between the switch controller 506 and the switches 504 in the switch cluster 500. All other information contained in the original packet (1) is maintained in the communication protocol packet (2).

Figure 5C:
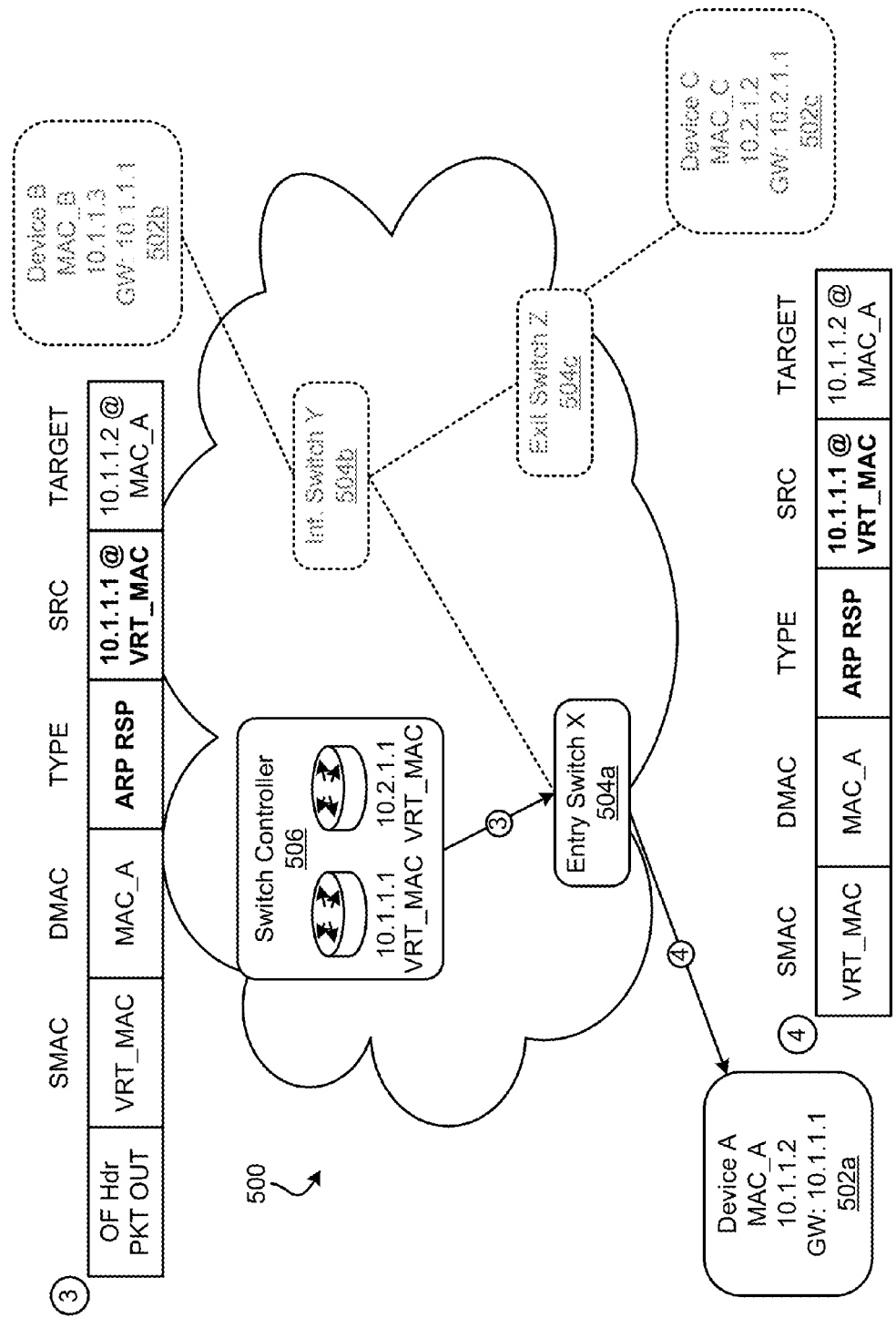

Next, as shown in FIG. 5C, the switch controller 506 determines the target of the packet (using any available resource, such as ARP tables, L3 tables, etc.), and then responds to the ARP request packet with an output packet (3) which is an ARP response packet (ARP RSP) and adheres to the communication protocol packet format (OF Hdr PKT OUT). The packet (3) has the SMAC set as the switch controller's virtual router MAC address (VRT_MAC), the DMAC is set as the MAC address of Device A 502a (MAC_A), the source is set as 10.1.1.1 @ VRT_MAC which corresponds with the first subnet on the switch controller 506, and the target is set as 10.1.1.2 @ MAC_A which corresponds to Device A 502a. Entry Switch X 504a receives the packet (3) and reformats it to adhere to the packet format (4), where the header is stripped, and sends the packet (4) to Device A 502a. In this way, each packet which is sent from Device A 502a will now be directed to and delivered to the first subnet virtual router of the switch controller 506 for further forwarding through the switch cluster 500.

Figure 5D:
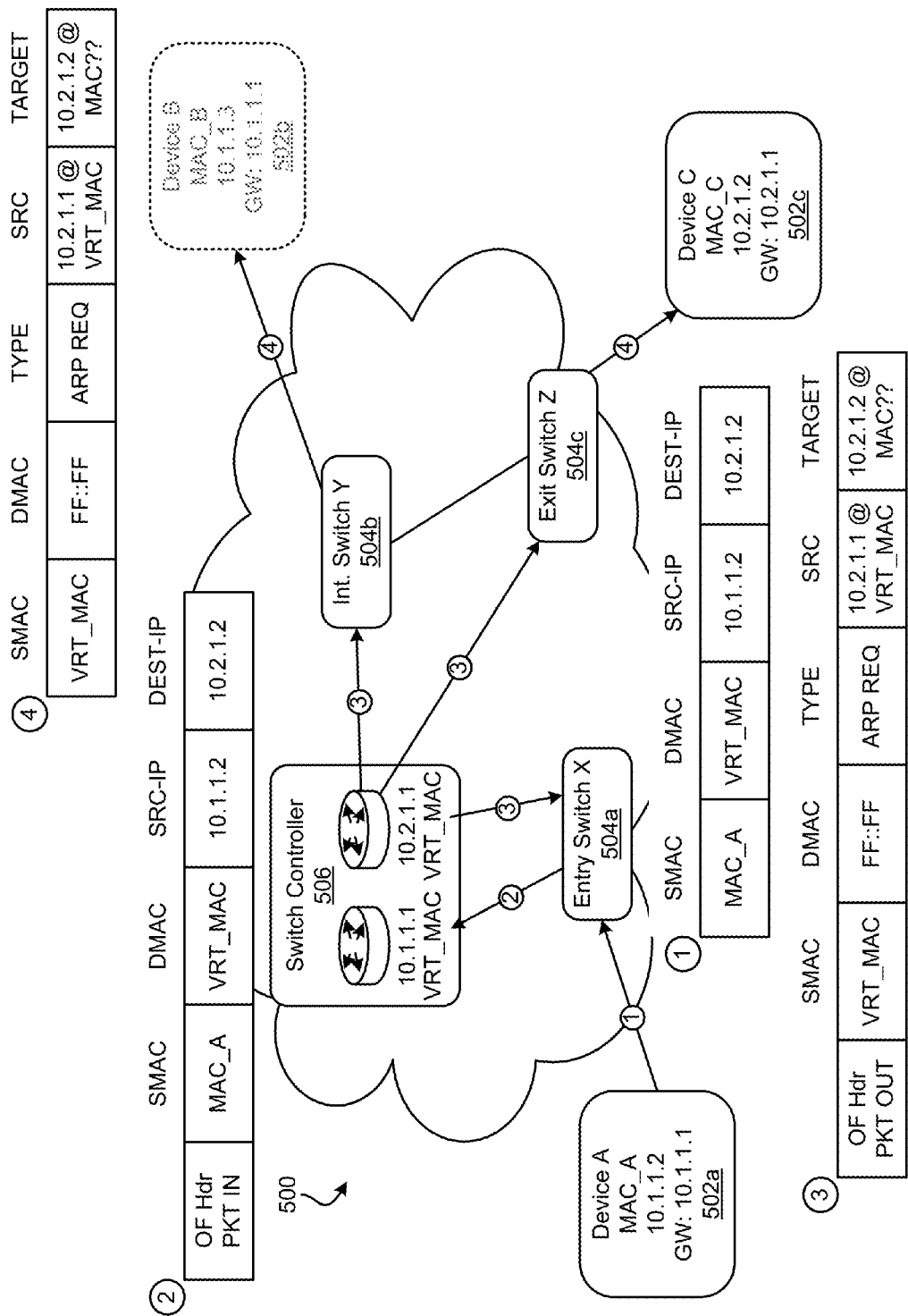

Now referring to FIG. 5D, a second situation is described where destination IP ARP resolution is performed. This is performed when a packet is sent out for the first time and the switch controller 506 does not have an ARP entry for the destination of the packet. In this exemplary description, a packet is being sent from Device A 502a to Device C 502c, and the switch controller 506 does not have an ARP entry for Device C 502c.

First, a packet (1) is sent from the originating Device A 502a, which includes the SMAC for Device A 502a (MAC_A), DMAC for the virtual router n the switch controller 506 (VRT_MAC), source IP address (SRC-IP) for Device A 502a (10.1.1.2), and destination IP address (DEST-IP) for the target device (Device C 502c). This packet (1) is received by the Entry Switch X 504a. Since the Entry Switch X 504a does not have a route entry for Device C 502c, the switch reformats the packet to conform to communication protocol with the switch controller 506 (such as by adding an OF Hdr indicating an input packet) and forwards the packet (2) to the switch controller 506 to resolve this deficiency.

The switch controller 506 then determines that an ARP entry does not exist for Device C 502c, and therefore sends out an ARP request broadcast packet (3) using the second subnet virtual router (10.2.1.1) to all switches 504 in the switch cluster 500. The ARP request broadcast packet (3) is formatted for the communication protocol with an appropriate header (such as an OF Hdr PKT OUT) and indicates the source as the second subnet virtual router (10.2.1.1 @ VRT_MAC) and the target as Device C 502c (10.2.1.2 @ an unknown MAC address). All switches 504 in the switch cluster 500 then reformat and forward an ARP request broadcast packet (4) with the header stripped and all information maintained from packet (3). In this way, Device C 502c receives the ARP request broadcast packet (4) from Exit Switch Z 504c.

Figure 5E:
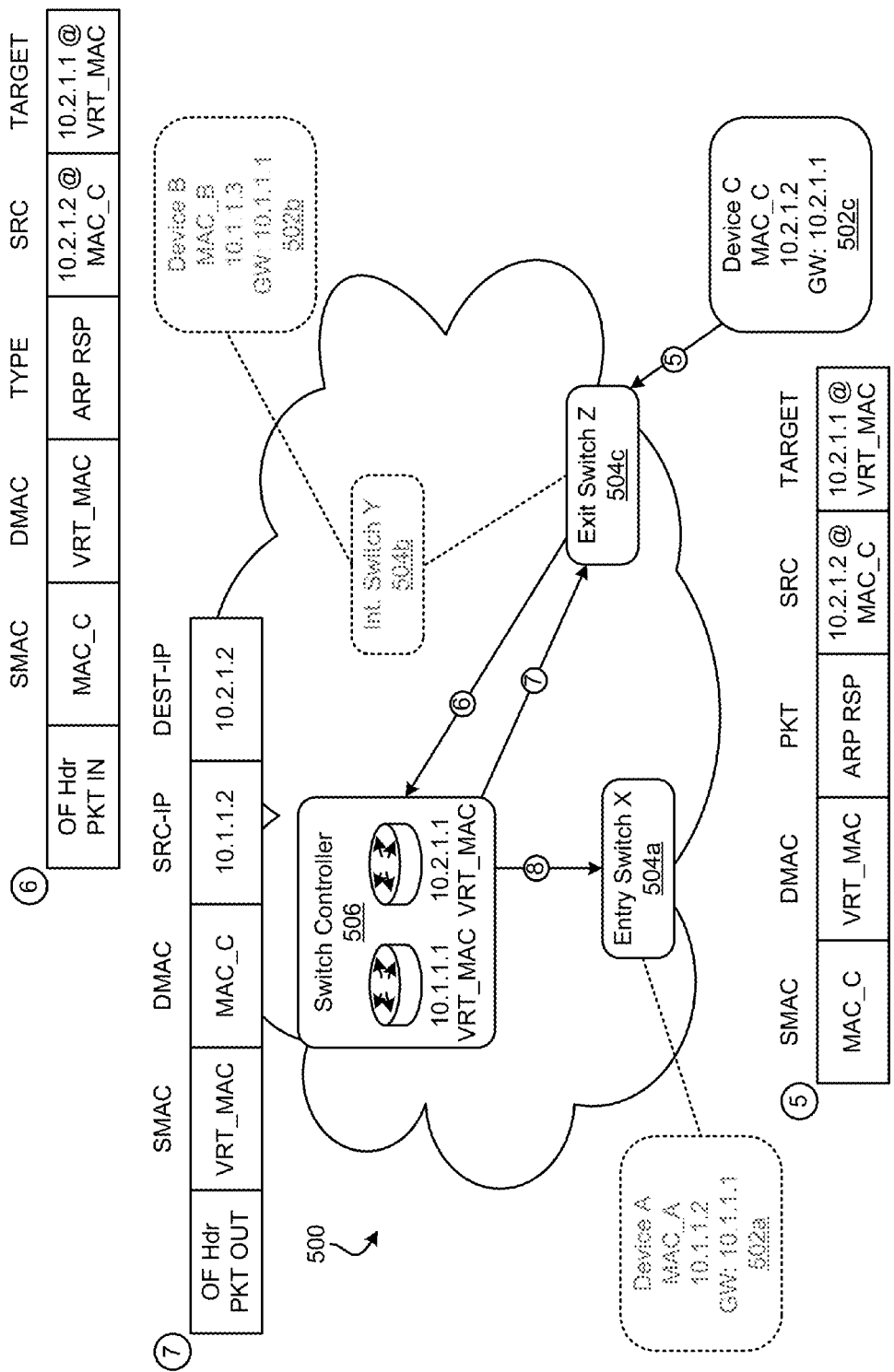

As shown in FIG. 5E, upon receipt of the packet (4), Device C 502c sends out an ARP response (ARP RSP) packet indicating the SMAC as Device C 502c (MAC_C), the DMAC as the switch controller 506, the source as Device C 502c (10.2.1.2 @ MAC_C), and the target as the second subnet virtual router (10.2.1.1 @ VRT_MAC). This ARP response packet (5) is received by the Exit Switch Z 504c, which then reformats the packet to adhere to the communication protocol by adding an appropriate header (such as OF Hdr PKT IN) and sends this packet (6), which maintains all the information from packet (5), to the switch controller 506.

Upon receipt of packet (6), the switch controller 506 resolves the ARP request with the ARP response, and therefore sends the original packet (7) from Device A 502a to Device C 502c via switch Z 504c. This packet will be formatted with the communication protocol header (such as OF Hdr PKT OUT) and indicates the SMAC as the virtual router (VRT_MAC) on the switch controller 506, the DMAC as Device C 502c (MAC_C), the SRC-IP as Device A 502a (10.1.1.2), and the DEST-IP as Device C 502c (10.2.1.2). To complete this transaction, switch Z 504c may send the original packet (1) to Device C 502c, although this action is not specifically shown. Furthermore, the switch controller 506 installs a host entry for Device C 502c on Exit Switch X 504a (8) to be used when any subsequent packets are sent through switch X 504a to Device C 502c.

Figure 5F:
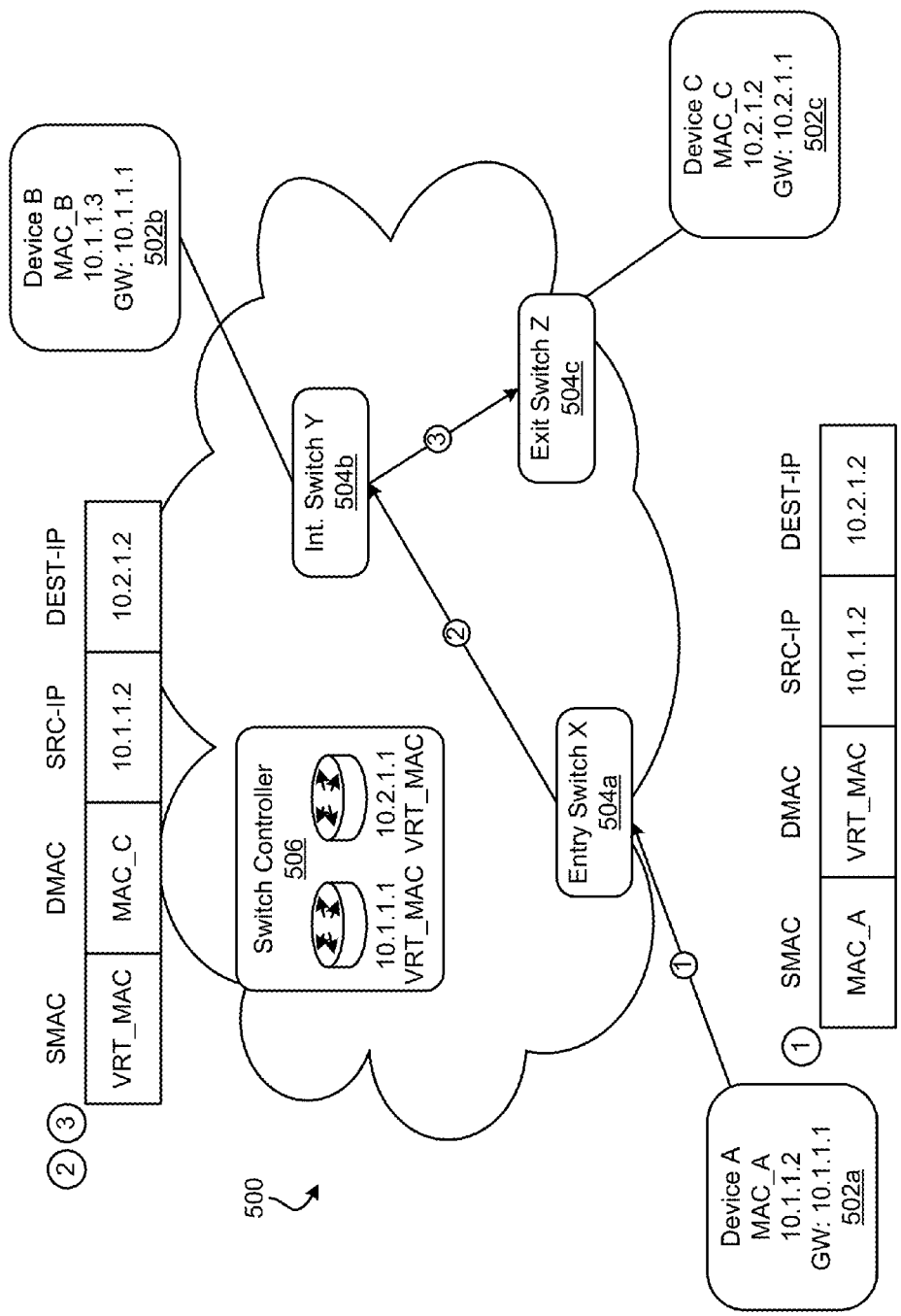

After these actions have been accomplished (ARP is resolved), direct flow of packets from Device A 502a to Device C 502c are possible, as shown in FIG. 5F according to an exemplary embodiment. As shown, Device A 502a creates a packet (1) addressed to the virtual router's DMAC (VRT_MAC) but to the IP address of Device C 502c (10.2.1.2). This packet is forwarded to Entry Switch X 504a, which performs L3 modification on the packet (1) to form packet (2) which indicates the SMAC as the virtual router (VRT_MAC) and the DMAC and DEST-IP as Device C 502c (10.2.1.2 @ MAC_C). This packet (2) may then be forwarded from Intermediate Switch Y 504b to Exit Switch Z 504c. Exit Switch Z 504c is then configured to deliver the packet to Device C 502c. Accordingly, after the initial L3 modifications at Entry Switch X 504a, no other modification are necessary to deliver the packet (1) to its intended destination.

To accomplish these switch cluster 500 capabilities, L3 support may be provided by the various components of the switch cluster 500 as described in more detail below, according to various embodiments.

The switch cluster 500 provides L3 support using the following constructs:

1. L3 or IP interfaces for the cluster: The hosts (devices) 502 connected to the switch cluster 500 are configured to point to these L3 or IP interfaces as their default gateway. An interfaces will belong to a VLAN—multiple instances can belong to a single VLAN.
2. A L3 Processing Module for the switch cluster 500, possibly located within the switch controller 506.
3. A L3 routing table for the entire switch cluster 500, which may include static routes, dynamic routes, or a combination thereof.
4. One or more flow table(s) stored to the switches 504 capable of performing L3 forwarding:
    a. L3 (forwarding) route table for performing longest prefix matches.
    b. L3 (forwarding) host table for reaching hosts 502 belonging to directly connected routes.
    c. The L3 hosts 502 and routes may be handled by the ternary content-addressable memory (TCAM) flows (if we do not have OpenFlow access to switch L3 forwarding tables)—however the TCAM flow table size will likely be smaller in most common switches.

Now referring to FIGS. 6A-6D, a switch cluster 600 is shown according to one embodiment. The switch cluster 600 comprises a plurality of switches 504a, 504b, . . . , 504n, such as Intermediate (Int.) Switch 504b, each switch being connected to a switch controller 506 via one or more switch controller connections. Any type of switch controller 506 may be used, such as an OpenFlow capable controller which communicates via OpenFlow to the plurality of switches 504. In some embodiments, one or more hosts 502a, 502b, . . . , 502n, may be connected to the switch cluster 600, such as Device A 502a, etc. The devices which are shown grayed out in the various figures do not have any actions in one or more operations described in the figure.

The explicitly shown switches (Entry Switch X 504a, Int. Switch Y 504b, Exit Switch Z 504c), host devices (Device A 502a, Device B 502b, Device D 502d), routers 602, and virtual routers on the switch controller 506 are for exemplary purposes only as any number of switches 504, devices 502, routers 602, virtual routers, and any other suitable components may be included in or connected to the switch cluster 600 as would be understood by one of skill in the art With the aid of the figures, a first situation is described where a first host which is connected to a first subnet attempts to send a packet to a second host which is indirectly connected to a second subnet. For the sake of this description, the first host is Device A 502a which is connected directly to Entry Switch X 504a, and the second host is Device D 502d which is indirectly connected to Exit Switch Z 504c via router 602. Furthermore, the first subnet is provided by the switch controller's virtual router having an IP address of 10.1.1.1, while the second subnet is provided by a second virtual router having an IP address of 10.2.1.1. Of course, the descriptions provided herein may apply to any two hosts connected to a switch cluster 600 and any subnets provided by the switch controller 506, as would be understood by one of skill in the art.

Figure 6A:
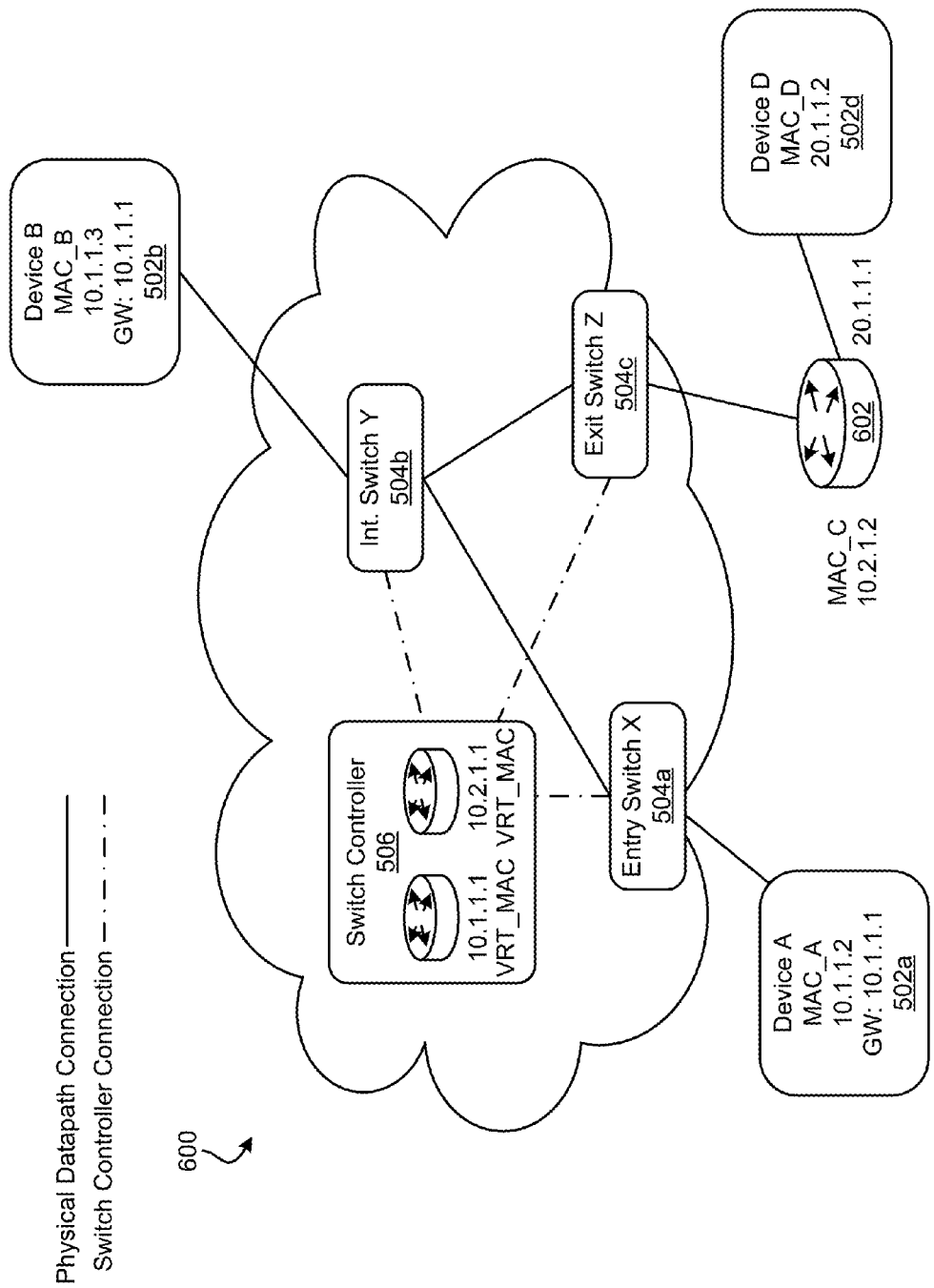
FIGS. 6A-6D show a switch cluster according to another embodiment.
Figure 6B:
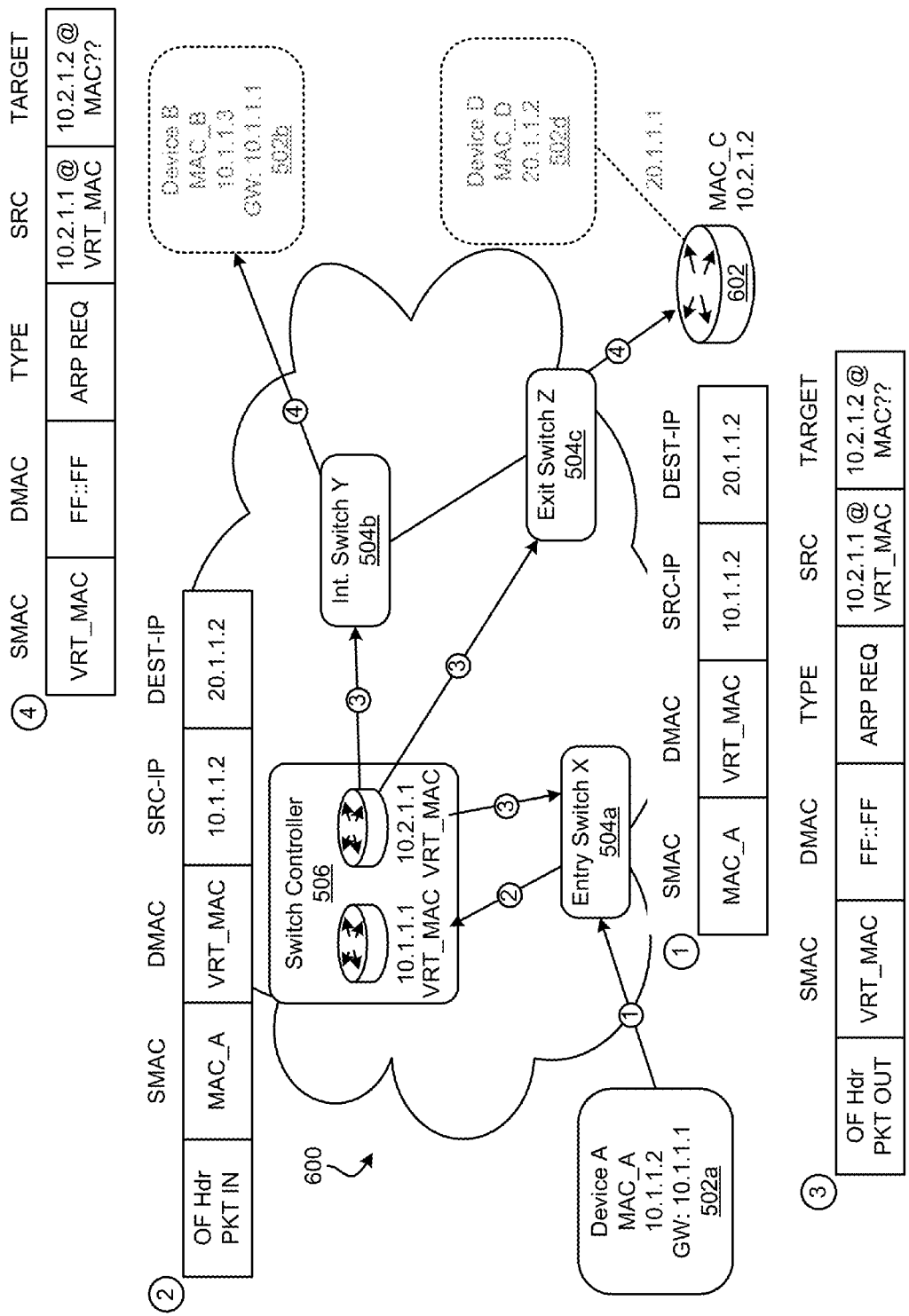

As shown in FIG. 6B, when Device A 502a sends a packet for the first time through the switch cluster 600 (through the gateway), source gateway ARP resolution is performed. To perform source gateway ARP resolution, Device A 502a sends a packet having the format shown by packet format (1), where the SMAC is set as the MAC address of Device A 502a (MAC_A), the DMAC is set as FF::FF, the type of packet is an ARP request packet (ARP REQ), the SRC-IP is indicated as 10.1.1.2, and the target is indicated as Device D 502d (20.1.1.2). This packet (1) is sent to the Entry Switch X 504a, which forwards the packet on to the switch controller 506 after adjusting the format of the packet, as indicated by packet format (2). This packet format (2) is an input packet adhering to OpenFlow (OF) protocol or some other suitable protocol for communication between the switch controller 506 and the switches 504 in the switch cluster 600. All other information contained in the original packet (1) is maintained in the communication protocol packet (2).

The switch controller 506 then determines that an ARP entry does not exist for Device D 502d, and therefore sends out an ARP request broadcast packet (3) using the second subnet virtual router (10.2.1.1) to all switches 504 in the switch cluster 600. The ARP request broadcast packet (3) is formatted for the communication protocol with an appropriate header (such as an OF Hdr PKT OUT) and indicates the source as the second subnet virtual router (10.2.1.1 @ VRT_MAC) and the target as router 602 (10.2.1.2 @ an unknown MAC address). All switches 504 in the switch cluster 600 then reformat and forward an ARP request broadcast packet (4) with the header stripped and all information maintained from packet (3). In this way, router 602 receives the ARP request broadcast packet (4) from Exit Switch Z 504c.

Figure 6C:
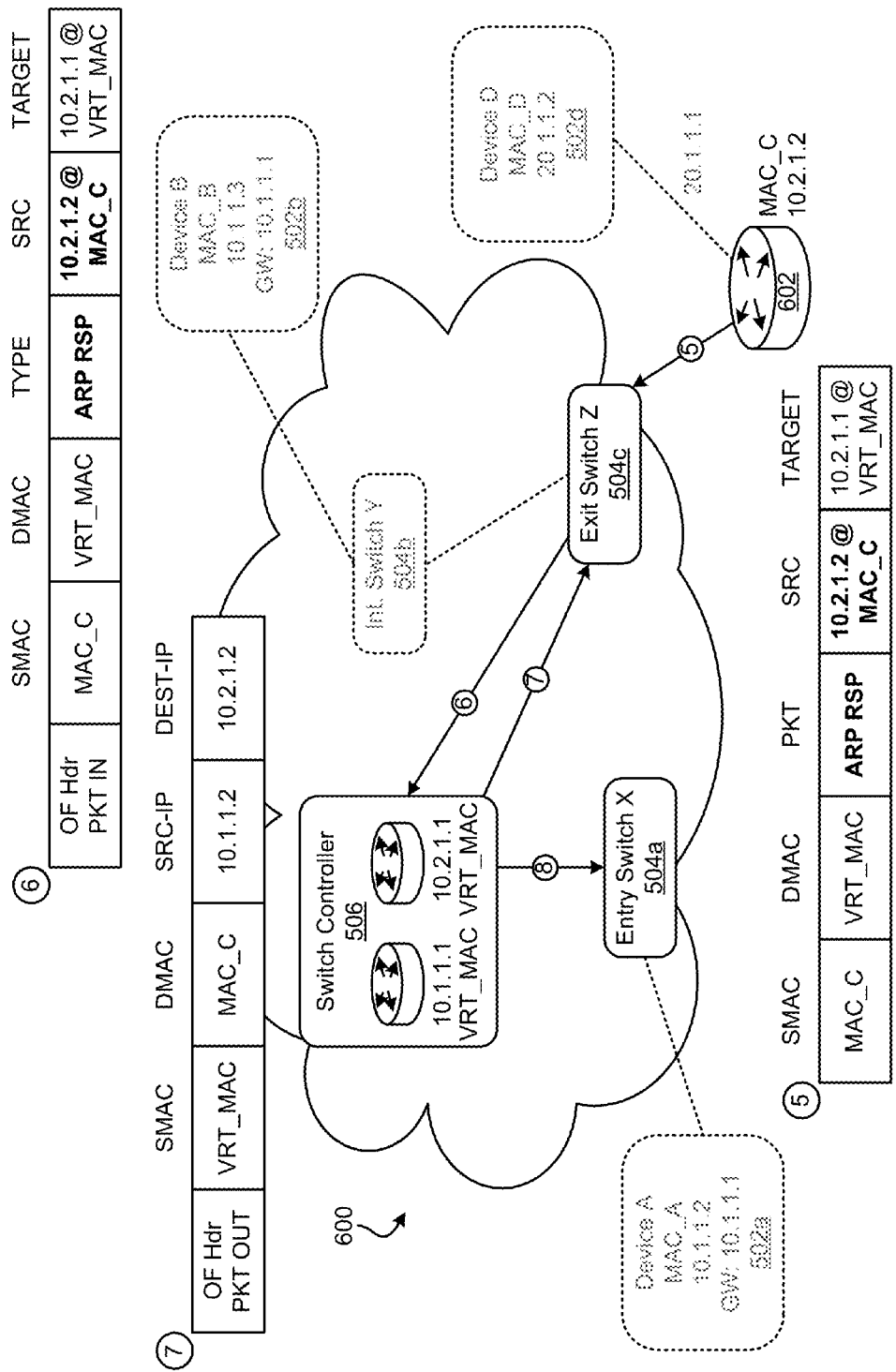

As shown in FIG. 6C, upon receipt of the packet (4), router 602 sends out an ARP response (ARP RSP) packet indicating the SMAC as router 602 (MAC_C), the DMAC as the virtual router on the switch controller 506, the source as router 602 (10.2.1.2 @ MAC_C), and the target as the second subnet virtual router (10.2.1.1 @ VRT_MAC). This ARP response packet (5) is received by the Exit Switch Z 504c, which then reformats the packet to adhere to the communication protocol by adding an appropriate header (such as OF Hdr PKT IN) and sends this packet (6), which maintains all the information from packet (5), to the switch controller 506.

Upon receipt of packet (6), the switch controller 506 resolves the ARP request with the ARP response, and therefore sends the original packet (7) from Device A 502a to Device D 502d via router 602 and switch Z 504c. This packet will be formatted with the communication protocol header (such as OF Hdr PKT OUT) and indicates the SMAC as the virtual router (VRT_MAC) on the switch controller 506, the DMAC as router 602 (MAC_C), the SRC-IP as Device A 502a (10.1.1.2), and the DEST-IP as router 602 (10.2.1.2). To complete this transaction, router 602 may send the original packet (1) to Device D 502d, although this action is not specifically shown. Furthermore, the switch controller 506 installs a host entry for router 602 on Exit Switch X 504a (8) to be used when any subsequent packets are sent through switch X 504a to router 602.

Figure 6D:
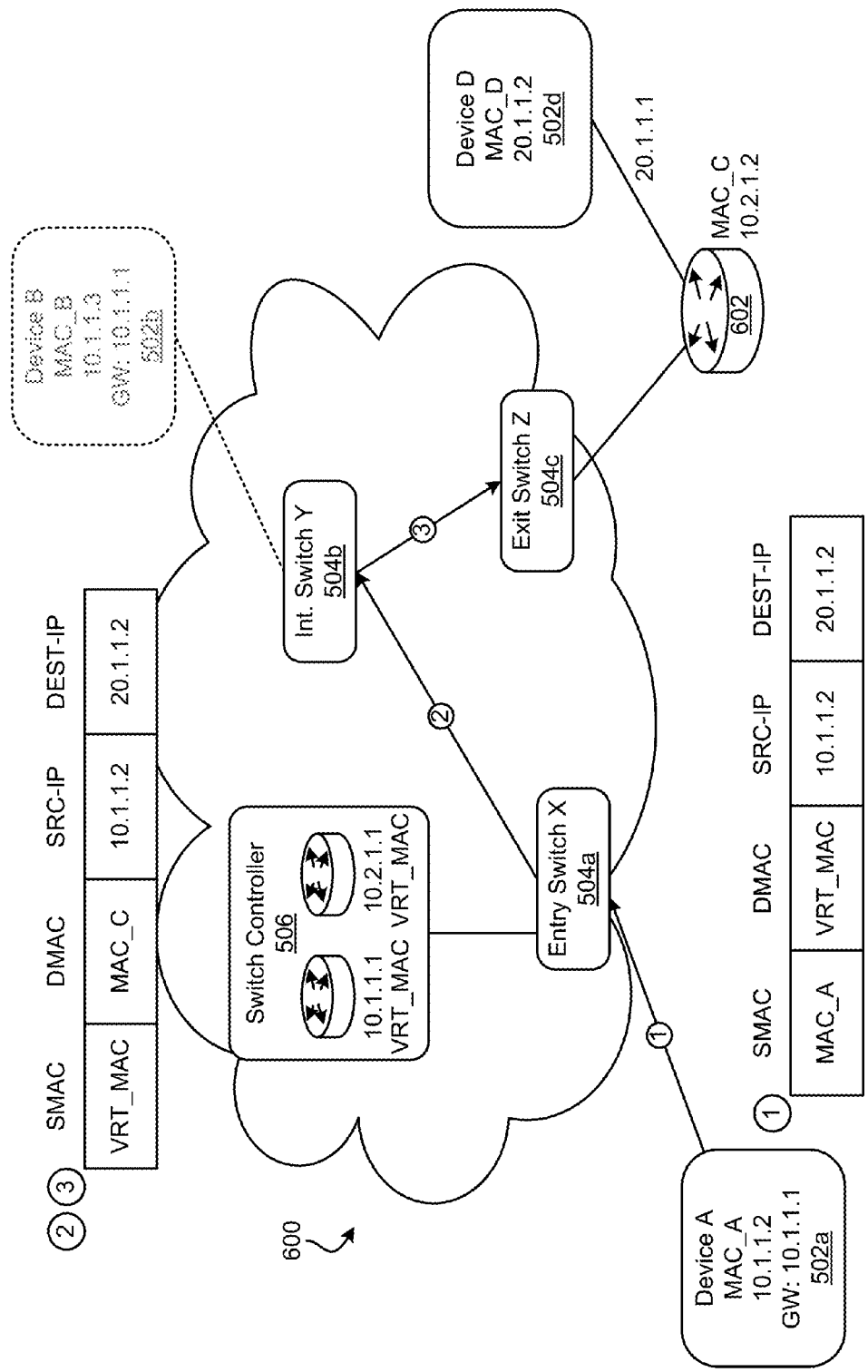

After these actions have been accomplished (ARP is resolved), direct flow of packets from Device A 502a to Device D 502d (and router 602) are possible, as shown in FIG. 6D according to an exemplary embodiment. As shown, Device A 502a creates a packet (1) addressed to the virtual router's DMAC (VRT_MAC) but to the IP address of Device D 502d (20.1.1.2). This packet is forwarded to switch X 504a, which performs L3 modification on the packet (1) to form packet (2) which indicates the SMAC as the virtual router (VRT_MAC), the DMAC as router 602 (MAC_C), and DEST-IP as Device D 502d (20.1.1.2). This packet (2) may then be forwarded from Intermediate Switch Y 504b as packet (3) to Exit Switch Z 504c. Exit Switch Z 504c is then configured to deliver the packet to Device D 502d via router 602. Accordingly, after the initial L3 modifications at Entry Switch X 504a, no other modification are necessary to deliver the packet (1) to its intended destination.

Figure 7:
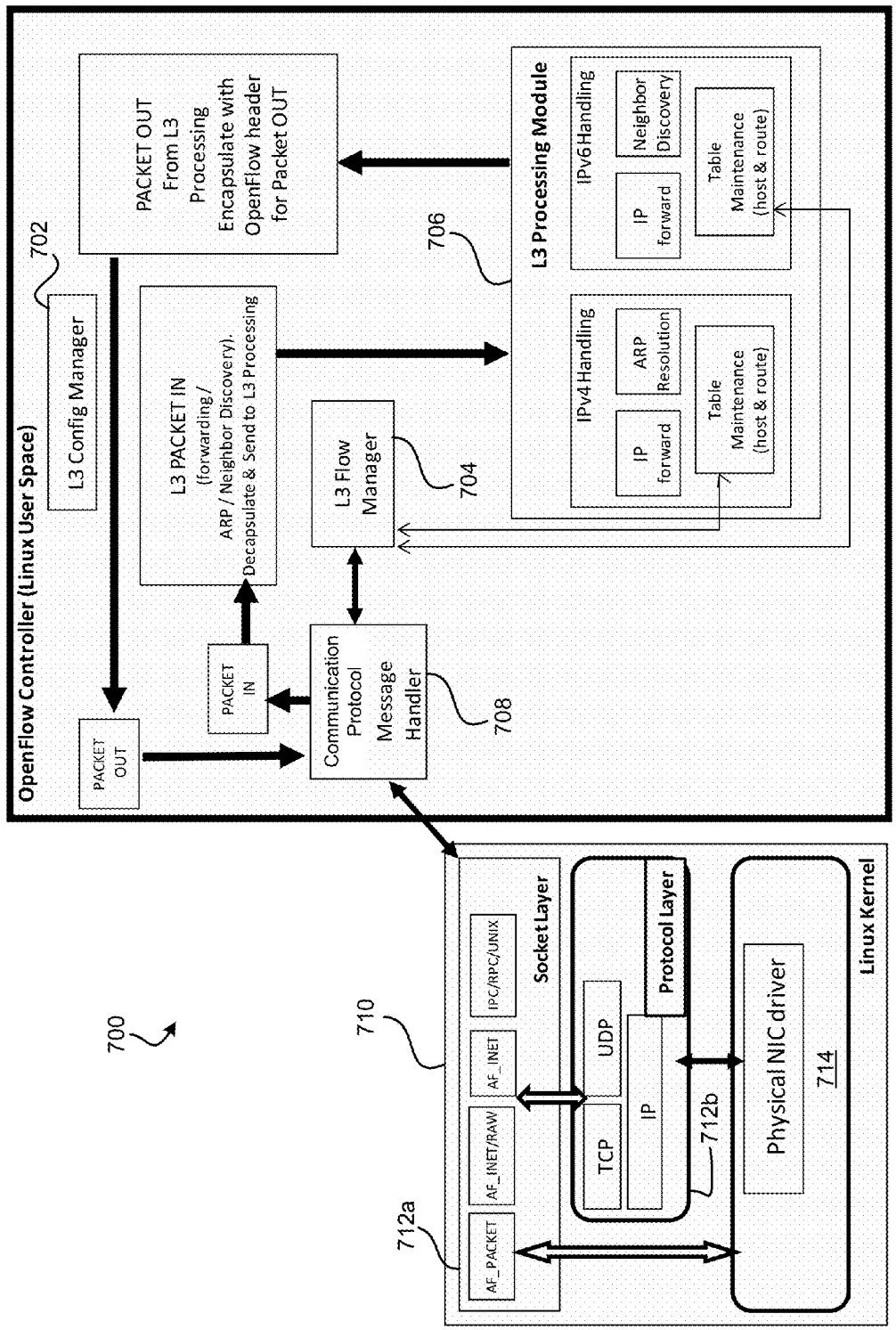
FIG. 7 shows an exemplary switch controller architecture according to one embodiment.

Now referring to FIG. 7, an exemplary switch controller architecture 700 is shown according to one embodiment. The switch controller may comprise some or all of the following components:

1. A L3 configuration manager 702 which may be used in the switch cluster for configuration tasks. The L3 configuration manager 702 may utilize an interface/subnet manager and a static routes manager in order to provide L3 configuration management for the switch cluster.
2. A L3 flow manager 704 which may be used for programming individual switches. The L3 flow manager 704 may utilize a routes flow manager with proactive flow installation and/or a hosts flow manager with reactive flow installation in order to provide L3 flow management for the switch cluster.
3. A L3 processing module 706 may be utilized in the switch cluster for processing tasks. The L3 processing module 706 may be configured for IPv4 handling and IPv6 handling in order to provide L3 processing for the switch cluster.

Of course, other components and/or modules may also be included in the switch controller architecture 700, such as a communication protocol message handler 708 (OpenFlow protocol message handler or any other suitable protocol). In addition, in some approaches, the message handler 708 may be configured to communicate with a Linux Kernel 710 which may include one or more processing layers (socket layer 712a, protocol layer 712b, etc.) and a physical or virtual network interface card (NIC) driver 714, among other possible components and/or modules.

Appropriate table programming in order for switch cluster L3 packets to be passed to the L3 logic in the switch chips may also be included in each switch in the switch cluster. This programming may include the following:

1. Switch's router MAC address in the switch chip programmed with the cluster MAC address.
2. Bits in the switch chip to turn on IPv4/IPv6 processing on the switch.
3. Communication protocol (such as OpenFlow) access to the L3 Interface table to program with the cluster IP interface information.
4. Communication protocol (such as OpenFlow) access to the L3 host table.
5. Communication protocol (such as OpenFlow) access to the L3 route table.

Figure 8:
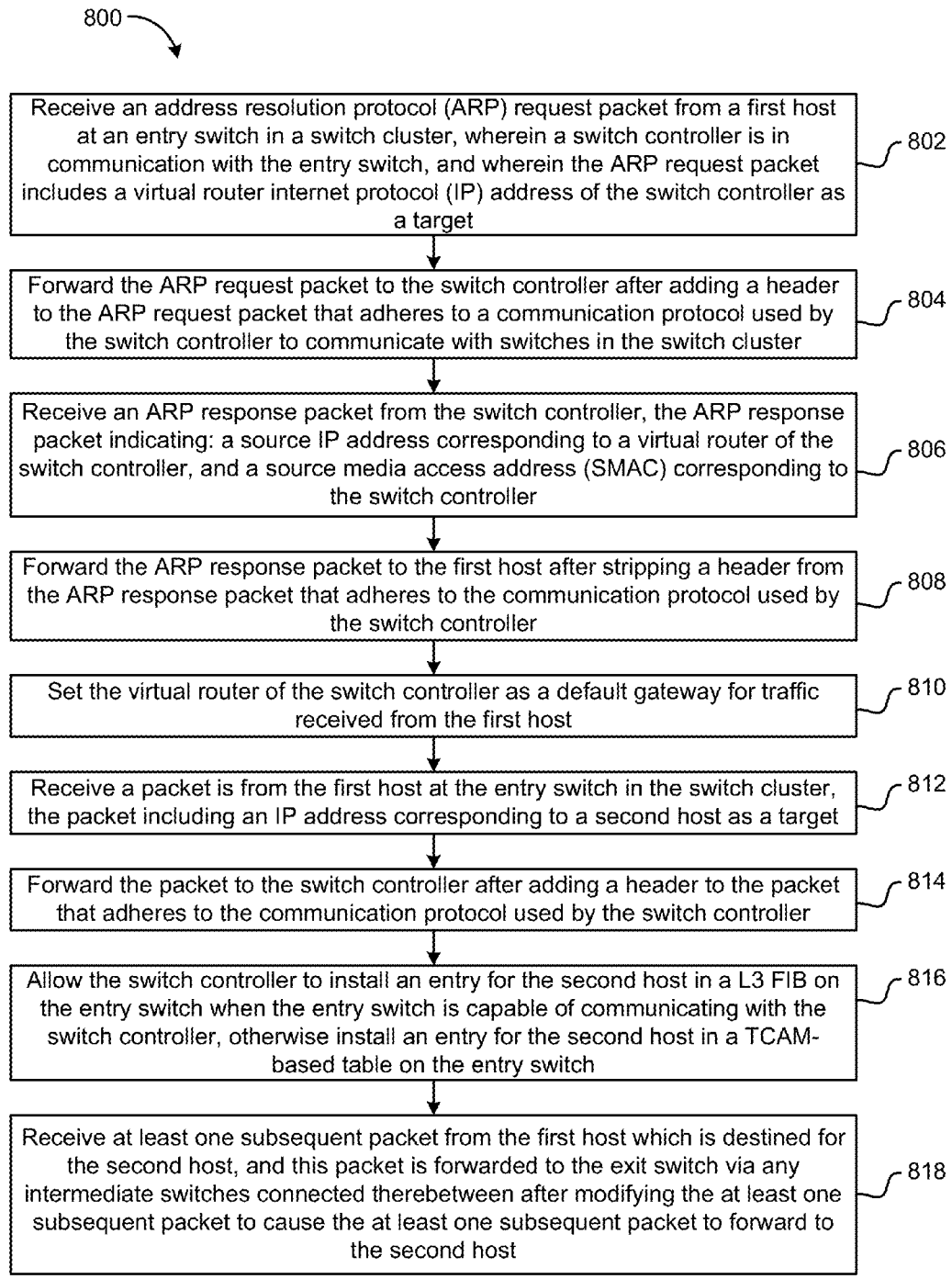
FIG. 8 is a flowchart of a method, according to one embodiment.

Now referring to FIG. 8, a method 800 for providing L3 distributed router functionality to a switch cluster is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by a cluster of switches, one or more vSwitches hosted by one or more servers, a server, a switch, a switch controller (such as a SDN controller, OpenFlow controller, etc.), a processor, e.g., a CPU, an application specific integrated circuit (ASIC), a field programmable gate array (FPGA), etc., one or more network interface cards (NICs), one or more virtual NICs, one or more virtualization platforms, or any other suitable device or component of a network system or cluster.

In operation 802, an ARP request packet is received from a first host at an entry switch in a switch cluster. The switch controller is in communication with the entry switch, and the ARP request packet includes a virtual router IP address of the switch controller as a target. Furthermore, the ARP request packet sent by the entry switch is sent in order to establish a default gateway for the entry switch for all traffic received from the first host.

In operation 804, the ARP request packet is forwarded to the switch controller after adding a header to the ARP request packet that adheres to a communication protocol used by the switch controller to communicate with switches in the switch cluster.

In various embodiments, the communication protocol may be OpenFlow or some other suitable communication protocol known in the art, and the switch cluster may be a SDN (along with the switch controller).

In more approaches, the switch controller may be configured to host more than one subnet, each subnet being configured to operate through a separate virtual router. In this way, the second host may be connected through a subnet that is different than the subnet on which the first host is connected through. Even though these hosts may be on different subnets, the switch controller is still capable of providing L3 distributed router functionality to all hosts connected to the switch cluster.

In operation 806, an ARP response packet is received from the switch controller. This ARP response packet is intended to provide the entry switch and first host with all information necessary to determine a default gateway for communications through the switch cluster. In one embodiment, the ARP response packet indicates at least a source IP address corresponding to a virtual router of the switch controller (possibly on a first subnet) and a SMAC corresponding to the switch controller.

In operation 808, the ARP response packet is forwarded to the first host after stripping a header from the ARP response packet that adheres to the communication protocol used by the switch controller. Since the first host is not able to understand the communication protocol header, it is removed prior to forwarding the packet.

In operation 810, the virtual router of the switch controller is set as a default gateway for traffic received from the first host. In this way, all traffic received from the first host is indicated as being forwarded to the virtual router for distribution thereof, but instead the traffic may be sent directly to an exit switch in communication with the intended host (via any intermediate switches therebetween) without visibility f this process to the first host.

In a further embodiment, the method may further include operations 812-818. Of course, operations 812-818 are not required to be executed in method 800. In operation 812, a packet is received from the first host at the entry switch in the switch cluster, the packet including an IP address corresponding to a second host as a target. The second host is connected to the switch cluster via an exit switch. Furthermore, operations 812-818 are performed when an ARP table in the switch controller in communication with the entry switch does not include an entry for the second host.

In operation 814, the packet is forwarded to the switch controller after adding a header to the packet that adheres to the communication protocol used by the switch controller.

In operation 816, installation from the switch controller is allowed of an entry for the second host in a flow table on the entry switch, such as an L3 FIB when the entry switch is capable of communicating with the switch controller, or a TCAM-based table when the entry switch is not capable of communicating with the switch controller. In this way, the entry switch will now have an entry for subsequent forwarding of any packets destined for the second host.

In operation 818, at least one subsequent packet is received from the first host which is destined for the second host, and this packet is forwarded to the exit switch via any intermediate switches connected therebetween after modifying the at least one subsequent packet to cause the at least one subsequent packet to forward to the second host.

According to one embodiment, the packet received from the first host may indicate a SMAC as a MAC address corresponding to the first host, a DMAC as a MAC address corresponding to the virtual router of the switch controller, a source IP address as an IP address corresponding to the first host, and a destination IP address as an IP address corresponding to an IP address of the second host.

In a further embodiment, modifying the at least one subsequent packet to cause the at least one subsequent packet to forward to the second host may comprise setting, for the at least one subsequent packet: a SMAC as the MAC address corresponding to the virtual router of the switch controller and a DMAC as a MAC address corresponding to the second host, the MAC address corresponding to the second host being derived from the L3 FIB on the entry switch.

Figure 9:
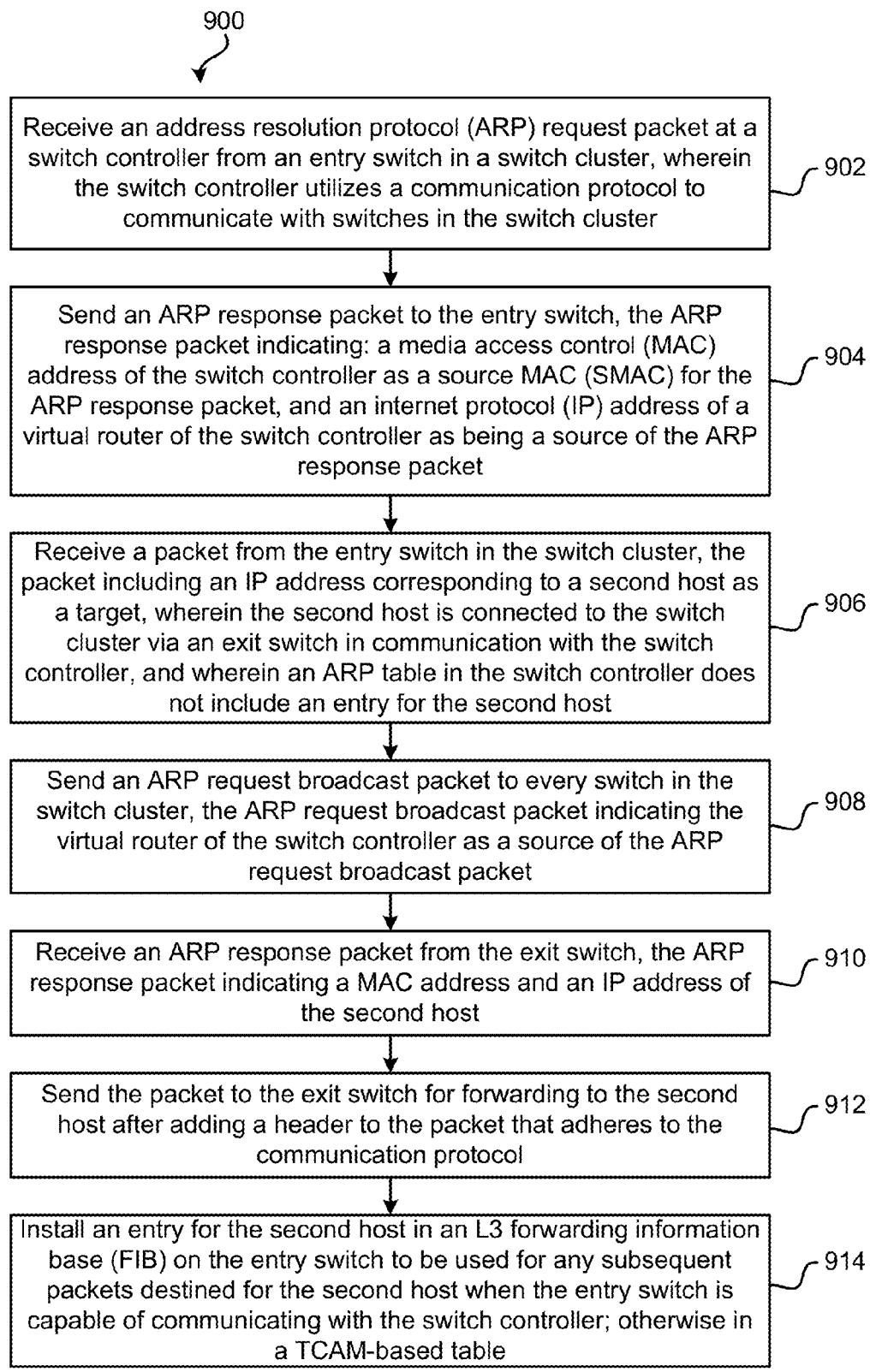
FIG. 9 is a flowchart of a method, according to one embodiment.

Now referring to FIG. 9, a method 900 for providing L3 distributed router functionality to a switch cluster is shown according to one embodiment. The method 900 may be performed in accordance with the present invention in any of the environments depicted in FIGS. 1-7, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by a cluster of switches, one or more vSwitches hosted by one or more servers, a server, a switch, a switch controller (such as a SDN controller, OpenFlow controller, etc.), a processor, e.g., a CPU, an ASIC, a FPGA, etc., one or more NICs, one or more virtual NICs, one or more virtualization platforms, or any other suitable device or component of a network system or cluster.

In operation 902, an ARP request packet is received at a switch controller from an entry switch in a switch cluster. The switch controller utilizes a communication protocol to communicate with switches in the switch cluster, such as OpenFlow or some other suitable protocol known in the art. In addition, the switch controller may be a SDN controller, and the switch cluster may be a SDN. Furthermore, the switch controller may be configured to host more than one subnet, each subnet being configured to operate through a separate virtual router of the switch controller.

In operation 904, an ARP response packet is sent to the entry switch, the ARP response packet indicating a MAC address of the switch controller as a SMAC for the ARP response packet and an IP address of a virtual router of the switch controller as being a source of the ARP response packet. In this way, any future traffic from the entry switch will be directed to the switch controller.

Operations 906-914 are in furtherance of method 900 and may be used when a packet is sent out from the first host to be delivered to a target that is unknown by the switch controller.

In operation 906, a packet from the entry switch in the switch cluster is received, the packet including an IP address corresponding to a second host as a target. The second host is connected to the switch cluster via an exit switch in communication with the switch controller, and an ARP table in the switch controller does not include an entry for the second host. Therefore, the switch controller must determine information for the second host prior to being able to direct the entry switch on how to send the packet to the second host.

In operation 908, an ARP request broadcast packet is sent from the switch controller to every switch in the switch cluster, the ARP request broadcast packet indicating the virtual router of the switch controller as a source of the ARP request broadcast packet. In this way, the switch controller will be able to determine information about the second host in a response packet.

In operation 910, an ARP response packet is received by the switch controller from the exit switch, the ARP response packet indicating a MAC address and an IP address of the second host. Now the switch controller may store this information for use in directing individual switches in the switch cluster as to how to forward packets to the second host.

In operation 912, the packet is sent from the switch controller to the exit switch for forwarding to the second host after adding a header to the packet that adheres to the communication protocol. This header is added so that the switch controller is able to utilize the communication protocol connections to the exit switch with which to send the packet.

In operation 914, an entry for the second host is installed in an L3 FIB when the entry switch is capable of communicating with the switch controller, or in a TCAM-based table when the entry switch is not capable of communicating with the switch controller. In more embodiments, some other flow table on the entry switch may be used to store the entry to be used for any subsequent packets destined for the second host.

In a further embodiment, the packet received from the entry switch may indicate a SMAC as a MAC address corresponding to the first host, a DMAC as a MAC address corresponding to the virtual router of the switch controller, a source IP address as an IP address corresponding to the first host, and a destination IP address as an IP address corresponding to an IP address of the second host.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a switch cluster comprising a plurality of switches, the plurality of switches including at least an entry switch having an interface for connecting to a first host and an exit switch having an interface for connecting to a second host; and
   a switch controller in communication with the plurality of switches in the switch cluster via a communication protocol;
   wherein the entry switch is configured to:
      receive an address resolution protocol (ARP) request packet from the first host, wherein the ARP request packet includes an internet protocol (IP) address corresponding to a virtual router of the switch controller as a target;
      forward the ARP request packet as a unicast packet to the switch controller after adding a header to the ARP request packet that adheres to the communication protocol;

receive an ARP response packet from the switch controller as a unicast packet, the ARP response packet indicating:
    a source IP address corresponding to a virtual router of the switch controller; and
    a source media access address (SMAC) corresponding to the switch controller;
forward the ARP response packet as a unicast packet to the first host after stripping a header from the ARP response packet that adheres to the communication protocol; and
set the virtual router of the switch controller as a default gateway for traffic received from the first host.

2. The system as recited in claim 1, wherein the entry switch is further configured to:
    receive a packet from the first host, the packet including an IP address corresponding to the second host as a target, wherein an ARP table in the switch controller in communication with the entry switch does not include an entry for the second host;
    forward the packet to the switch controller after adding a header to the packet that adheres to the communication protocol; and
    receive installation from the switch controller of an entry for the second host in an L3 forwarding information base (FIB) on the entry switch when the entry switch is capable of communicating with the switch controller, or install an entry for the second host in a ternary content-addressable memory (TCAM)-based table when the entry switch is not capable of communicating with the switch controller.

3. The system as recited in claim 2, wherein the entry switch is further configured to: forward at least one subsequent packet received from the first host, which is destined for the second host, to the exit switch via any intermediate switches connected therebetween after modifying the at least one subsequent packet to cause the at least one subsequent packet to forward to the second host.

4. The system as recited in claim 3, wherein the at least one subsequent packet received from the first host indicates a SMAC as a MAC address corresponding to the first host, a destination MAC address (DMAC) as a MAC address corresponding to the virtual router of the switch controller, a source IP address as an IP address corresponding to the first host, and a destination IP address as an IP address corresponding to an IP address of the second host.

5. The system as recited in claim 4, wherein the entry switch is further configured to modify the at least one subsequent packet by setting, for the at least one subsequent packet:
    a SMAC as the MAC address corresponding to the virtual router of the switch controller; and
    a DMAC as a MAC address corresponding to the second host, the MAC address corresponding to the second host being derived from the L3 FIB on the entry switch.

6. The system as recited in claim 1, wherein the communication protocol is OpenFlow and the switch cluster is a software defined network (SDN), and wherein the switch controller comprises:
    an L3 configuration manager configured to perform configuration tasks utilizing an interface/subnet manager and a static routes manager to provide L3 configuration management for the switch cluster;
    an L3 flow manager configured to program individual switches utilizing at least one of: a routes flow manager with proactive flow installation, and a hosts flow manager with reactive flow installation in order to provide L3 flow management for the switch cluster; and
    an L3 processing module configured for IPv4 handling and IPv6 handling to provide L3 processing for the switch cluster.

7. The system as recited in claim 1, wherein the switch controller is configured to host more than one subnet, each subnet being configured to operate through a separate virtual router, and wherein all virtual routers use the same media access control (MAC) address.

8. The system as recited in claim 1, wherein the switch controller is configured to:
    receive the ARP request packet from the entry switch; and
    send the ARP response packet to the entry switch, the ARP response packet indicating:
        a MAC address of the switch controller as a SMAC for the ARP response packet; and
        an IP address of a virtual router of the switch controller as being a source of the ARP response packet.

9. The system as recited in claim 8, wherein the switch controller is further configured to:
    receive a packet from the entry switch, the packet including an IP address corresponding to the second host as a target, wherein an ARP table in the switch controller does not include an entry for the second host;
    send an ARP request broadcast packet to every switch in the switch cluster, the ARP request broadcast packet indicating the virtual router of the switch controller as a source of the ARP request broadcast packet;
    receive an ARP response packet from the exit switch, the ARP response packet indicating a MAC address and an IP address of the second host;
    send the packet to the exit switch for forwarding to the second host after adding a header to the packet that adheres to the communication protocol; and
    install an entry for the second host in an L3 forwarding information base (FIB) on the entry switch to be used for any subsequent packets destined for the second host.

10. The system as recited in claim 9, wherein the packet received from the entry switch indicates a SMAC as a MAC address corresponding to the first host, a DMAC as a MAC address corresponding to the virtual router of the switch controller, a source IP address as an IP address corresponding to the first host, and a destination IP address as an IP address corresponding to an IP address of the second host.

11. A method for providing Layer-3 (L3) distributed router functionality to a switch cluster, the method comprising:
    receiving an address resolution protocol (ARP) request packet from a first host at an entry switch in a switch cluster, wherein a switch controller is in communication with the entry switch, and wherein the ARP request packet includes a virtual router internet protocol (IP) address of the switch controller as a target;
    forwarding the ARP request packet as a unicast packet to the switch controller after adding a header to the ARP request packet that adheres to a communication protocol used by the switch controller to communicate with switches in the switch cluster;
    receiving an ARP response packet from the switch controller as a unicast packet, the ARP response packet indicating:
        a source IP address corresponding to a virtual router of the switch controller; and
        a source media access address (SMAC) corresponding to the switch controller;
    forwarding the ARP response packet as a unicast packet to the first host after stripping a header from the ARP response packet that adheres to the communication protocol used by the switch controller; and setting the virtual router of the switch controller as a default gateway for traffic received from the first host.

12. The method as recited in claim 11, further comprising:
receiving a packet from the first host at the entry switch in the switch cluster, the packet including an IP address corresponding to a second host as a target, wherein the second host is connected to the switch cluster via an exit switch, and wherein an ARP table in the switch controller in communication with the entry switch does not include an entry for the second host;
forwarding the packet to the switch controller after adding a header to the packet that adheres to the communication protocol used by the switch controller;
receiving installation from the switch controller of an entry for the second host in an L3 forwarding information base (FIB) on the entry switch when the entry switch is capable of communicating with the switch controller, or installing an entry for the second host in a ternary content-addressable memory (TCAM)-based table when the entry switch is not capable of communicating with the switch controller; and
forwarding at least one subsequent packet received from the first host, which is destined for the second host, to the exit switch via any intermediate switches connected therebetween after modifying the at least one subsequent packet to cause the at least one subsequent packet to forward to the second host.

13. The method as recited in claim 12, wherein the packet received from the first host indicates a SMAC as a MAC address corresponding to the first host, a DMAC as a MAC address corresponding to the virtual router of the switch controller, a source IP address as an IP address corresponding to the first host, and a destination IP address as an IP address corresponding to an IP address of the second host.

14. The method as recited in claim 13, wherein the modifying the at least one subsequent packet to cause the at least one subsequent packet to forward to the second host comprises setting, for the at least one subsequent packet:
a SMAC as the MAC address corresponding to the virtual router of the switch controller; and
a DMAC as a MAC address corresponding to the second host, the MAC address corresponding to the second host being derived from the L3 FIB on the entry switch.

15. The method as recited in claim 11, wherein the communication protocol is OpenFlow and the switch cluster is a software defined network (SDN).

16. The method as recited in claim 11, wherein the switch controller is configured to host more than one subnet, each subnet being configured to operate through a separate virtual router, and wherein all virtual routers use the same media access control (MAC) address.

17. A method for providing Layer-3 (L3) distributed router functionality to a switch cluster, the method comprising:
receiving an address resolution protocol (ARP) request packet as a unicast packet at a switch controller from an entry switch in a switch cluster, wherein the entry switch is connected to a first host, and wherein the switch controller utilizes a communication protocol to communicate with switches in the switch cluster; and
sending an ARP response packet as a unicast packet to the entry switch, the ARP response packet indicating:
a media access control (MAC) address of the switch controller as a source MAC (SMAC) for the ARP response packet; and
an internet protocol (IP) address of a virtual router of the switch controller as being a source of the ARP response packet.

18. The method as recited in claim 17, further comprising:
receiving a packet from the entry switch in the switch cluster, the packet including an IP address corresponding to the first host as a source and an IP address corresponding to a second host as a target, wherein the second host is connected to the switch cluster via an exit switch in communication with the switch controller, and
wherein an ARP table in the switch controller does not include an entry for the second host;
sending an ARP request broadcast packet to every switch in the switch cluster, the ARP request broadcast packet indicating the virtual router of the switch controller as a source of the ARP request broadcast packet;
receiving an ARP response packet from the exit switch, the ARP response packet indicating a MAC address and an IP address of the second host;
sending the packet to the exit switch for forwarding to the second host after adding a header to the packet that adheres to the communication protocol; and
installing an entry for the second host in an L3 forwarding information base (FIB) on the entry switch to be used for any subsequent packets destined for the second host when the entry switch is capable of communicating with the switch controller, or installing an entry for the second host in a ternary content-addressable memory (TCAM)-based table of the entry switch when the entry switch is not capable of communicating with the switch controller.

19. The method as recited in claim 18, wherein the packet received from the entry switch indicates a SMAC as a MAC address corresponding to the first host, a DMAC as a MAC address corresponding to the virtual router of the switch controller, a source IP address as an IP address corresponding to the first host, and a destination IP address as an IP address corresponding to an IP address of the second host.

20. The method as recited in claim 17, wherein the communication protocol is OpenFlow and the switch cluster is a software defined network (SDN), and wherein the switch controller is configured to host more than one subnet, each subnet being configured to operate through a separate virtual router, and wherein all virtual routers use the same media access control (MAC) address.

* * * * *